(12) United States Patent
Tamura

(10) Patent No.: US 6,968,677 B2
(45) Date of Patent: Nov. 29, 2005

(54) EXHAUST EMISSION CONTROL APPARATUS FOR INTERNAL COMBUSTION ENGINE

(75) Inventor: Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 411 days.

(21) Appl. No.: 10/387,498

(22) Filed: Mar. 14, 2003

(65) Prior Publication Data
US 2003/0225507 A1 Dec. 4, 2003

(30) Foreign Application Priority Data
Mar. 15, 2002 (JP) .............................. 2002-072410

(51) Int. Cl.⁷ ............................................... F01N 3/00
(52) U.S. Cl. ......................................... 60/277; 60/324
(58) Field of Search ................................. 60/277, 324

(56) References Cited

U.S. PATENT DOCUMENTS 6,109,027 A * 8/2000 Schaefer ..................... 60/324
6,182,445 B1 * 2/2001 Yamazaki et al. ............ 60/277
6,273,058 B1 * 8/2001 Wagner ...................... 123/323
6,381,952 B1 * 5/2002 Asanuma et al. ............. 60/284
6,711,892 B2 * 3/2004 Tamura et al. ................ 60/277

FOREIGN PATENT DOCUMENTS

| JP | 3-117611 A | 5/1991 |
| JP | 4-183921 A | 6/1992 |

* cited by examiner

Primary Examiner—Thomas Denion
Assistant Examiner—Diem Tran
(74) Attorney, Agent, or Firm—Birch, Stewart, Kolasch & Birch, LLP

(57) ABSTRACT

There is provided an exhaust emission control apparatus for an internal combustion engine, which includes a failure diagnostic device that fixes three parameters selected from the group consisting of the engine speed detected by an engine speed detecting device, the fuel quantity controlled by a fuel quantity control device, the ignition timing controlled by an ignition timing control device, and the intake air volume controlled by an intake air control device at respective predetermined values, and finds values of the remaining one parameter, and compares the values of the remaining one parameter with each other to determine whether an exhaust flow control apparatus has failed or not.

11 Claims, 9 Drawing Sheets

FULLY CLOSED

FULLY OPENED

EXHAUST EMISSION CONTROL APPARATUS FOR INTERNAL COMBUSTION ENGINE

CROSS-REFERENCE TO THE RELATED APPLICATION

The application incorporates by reference the subject matter of Application No. 2002-72410 filed in Japan on Mar. 15, 2002, on which a priority claim is based on under 35 U.S.C. §119(a).

BACKGROUND OF THE INVENTION

1. Field of the Invention

The present invention relates to a failure diagnosing technique for determining whether an exhaust flow control apparatus, which suppresses the flow of exhaust, has failed or not.

2. Description of the Related Art

Conventionally, an exhaust emission control technique utilizing the reaction on a catalyst has been known as a technique for reducing harmful substances (e.g., unburned substances such as HC, CO, and $H_2$ as well as smoke, $NO_x$, and so forth) in exhaust.

This exhaust emission control technique, however, has the problem that unburned substances such as HC are emitted into the atmosphere during the period until the catalyst is activated. This is a serious problem because the amount of harmful substances emitted into the atmosphere during the period until the catalyst is activated reaches about 90% of the total emission in a cold mode.

To address this problem, as disclosed in Japanese Laid-Open Patent Publication (Kokai) No. 3-117611 and Japanese Laid-Open Patent Publication (Kokai) No. 4-183921, a technique where the exhaust pressure is increased so as to promptly activate a catalyst in a cold mode has been developed.

According to this technique, a sealed type variable exhaust valve, for example, serving as an exhaust flow control device is disposed downstream in an exhaust passage. With this arrangement, when the sectional area of an exhaust pipe is varied by regulating the sealed type variable exhaust valve, the exhaust passage resistance and the exhaust concentration are increased or the exhaust flow rate is lowered to increase the exhaust pressure as well as the exhaust gas temperature.

The increase in the exhaust pressure as mentioned above promotes the reaction of unburned substances in an exhaust system (from a combustion chamber to an exhaust passage), and increases the exhaust gas temperature, thus promptly activating the catalyst and improving the exhaust purifying efficiency.

Incidentally, since the above-mentioned sealed type variable exhaust valve is subjected to high temperatures and high pressures, it may break down if used for a long period of time, causing malfunction of its valve.

The malfunction of the valve of the sealed type variable exhaust causes the problem that the valve cannot close and therefore the exhaust pressure cannot be increased even when the exhaust pressure is required to be increased, or the valve is kept closed and therefore the exhaust pressure remains high even when the exhaust pressure is not required to be increased.

If the exhaust pressure cannot be increased, the harmful substances emitted until the activation of the catalyst may not be satisfactorily purified because the purification of exhaust emission is not promoted. Also, if the exhaust pressure is kept at a high pressure, the exhaust efficiency is lowered to decrease the output of the internal combustion engine, which is not preferable.

To address this problem, it has been proposed that an exhaust pressure sensor is provided in an exhaust passage so that a failure of the sealed type variable exhaust valve can be detected based on exhaust pressure information supplied from the exhaust pressure sensor.

In the case where the exhaust pressure sensor is used, however, there is the necessity of additionally providing the exhaust pressure sensor. The exhaust pressure sensor is usually expensive because it must be configured to withstand high temperatures and high pressures, thus increasing the cost of parts. Moreover, the exhaust pressure sensor itself may break down.

Further, in consideration of the fact that the diffusion speed varies according to the exhaust pressure, it has been proposed that an exhaust gas sensor (such as an $O_2$ sensor, an LAFS, or the like) is used to detect a failure of the sealed type variable exhaust valve.

In this case, however, since the failure detecting accuracy of the sealed variable exhaust valve is greatly affected by the accuracy of the exhaust gas sensor, the failure detecting accuracy is lowered as the exhaust gas sensor deteriorates with age. Moreover, as is the case with the exhaust pressure sensor, the exhaust gas sensor itself may break down.

SUMMARY OF THE INVENTION

It is therefore an object of the present invention to provide an exhaust emission control apparatus for an internal combustion engine, which is capable of reliably detecting a failure of an exhaust flow control device, which suppresses the flow of exhaust so as to sufficiently reduce harmful substances in exhaust, at a low cost.

To attain the above object, there is provided an exhaust emission control apparatus for an internal combustion engine, comprising: an exhaust flow control device that suppresses exhaust flow so as to reduce harmful substances in exhaust; an engine speed detecting device that detects an engine speed; a fuel quantity control device that controls a fuel quantity contributed to output torque; an ignition timing control device that controls ignition timing; an intake air volume control device that controls an intake air volume; and a failure diagnostic device that fixes three parameters selected from the group consisting of the engine speed detected by the engine speed detecting device, the fuel quantity controlled by the fuel quantity control device, the ignition timing controlled by the ignition timing control device, and the intake air volume controlled by the intake air volume control device at respective predetermined values and finds values of a remaining one parameter irrespective of a degree to which the exhaust flow is suppressed by the exhaust flow control device, and compares the values of the remaining one parameter with each other to determine whether the exhaust flow control device has failed.

With the above arrangement, whether the exhaust fuel control device has failed or not can be determined according to the fuel injection quantity, ignition timing, intake air volume, and engine speed in a reliable manner at a low cost.

The present invention has been developed based on the knowledge as described below.

The fuel injection quantity, ignition timing, and intake air volume are inputted and the engine speed and the engine power are outputted to control an internal combustion engine (engine). The engine power is largely determined based on the above-mentioned control inputs and the engine speed, and the engine speed is determined based on the fuel injection quantity, ignition timing, and intake air volume. Thus, if the external load (such as the degree of suppression of exhaust flow, i.e. the exhaust pressure) applied to the engine is equal, the determination of three parameters selected from the group consisting of the fuel injection quantity, ignition timing, intake air volume, and engine speed will automatically determine the remaining one parameter. In other words, if three parameters selected from the group consisting of the fuel injection quantity, ignition timing, intake air volume, and engine speed are fixed, the remaining one parameter varies with a change in the external load (such as the degree of suppression of exhaust flow, i.e. the exhaust pressure) applied to the engine.

Namely, how the external load (such as the degree of suppression of exhaust flow, i.e. the exhaust pressure) on the engine varies can be easily recognized by monitoring a variation in the remaining one parameter.

As a result, if three parameters selected from the group consisting of the fuel injection quantity, ignition timing, intake air volume, and engine speed are fixed at respective predetermined values and values of the remaining one parameter are monitored and compared with each other, the actual variation in the degree of suppression of exhaust flow (i.e. the exhaust pressure) can be recognized to make it possible to easily determine whether the exhaust flow control device has failed or not.

For example, if it is determined that a value of the remaining one parameter is not greatly changed although the flow of exhaust has been suppressed, it can be easily determined that the flow of exhaust has not been sufficiently suppressed and the exhaust flow control device has failed.

In one preferred form of the present invention, the failure diagnostic device is operable when the exhaust flow has not been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is suppressed, for fixing the three parameters at the respective predetermined values, finding a value of the remaining one parameter as a second parameter value, and determining whether the exhaust flow control device has failed according to a difference between the first parameter value and the second parameter value.

Specifically, a value of the remaining one parameter in the case where the exhaust flow has not been suppressed is found as a first parameter value (reference value), and a value of the remaining one parameter in the case where the exhaust flow is suppressed is found as a second parameter value, and a variation in the degree of exhaust flow suppression is recognized according to a difference between the first parameter value and the second parameter value. As a result, it is possible to easily and reliably determine whether the exhaust flow control device has failed or not (e.g., sticking in a state of open).

In another preferred form of the present invention, the failure diagnostic device is operable when the exhaust flow control device has not broken down and the exhaust flow has not been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is suppressed, for fixing the three parameters at the respective predetermined values, finding a value of the remaining one parameter as a second parameter value, and determining whether the exhaust flow control device has failed according to a difference between the first parameter value and the second parameter value.

Specifically, a value of the remaining one parameter in the case where the exhaust flow control device has not broken down and the exhaust flow has not been suppressed is found in advance as a first parameter value (determination reference value), and a value of the remaining one parameter in the case where the exhaust flow is suppressed is found as a second parameter value, and a variation in the degree of exhaust flow suppression is recognized according to a difference between the first parameter value and the second parameter value. As a result, it is possible to easily and reliably determine whether the exhaust flow control device has failed or not (e.g., sticking in a state of opening) according to the absolute determination reference value.

In still another preferred form of the present invention, the failure diagnostic device is operable when the exhaust flow control device has not broken down and the exhaust flow has been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is not suppressed, for fixing the three parameters at the respective predetermined values, finding a value of the remaining one parameter as a second parameter value, and determining whether the exhaust flow control device has failed according to a difference between the first parameter value and the second parameter value.

Specifically, a value of the remaining one parameter in the case where the exhaust flow control device has not broken down and the exhaust flow has been suppressed is found in advance as a first parameter value (determination reference value), and a value of the remaining one parameter in the case where the exhaust flow is not suppressed is found as a second parameter value, and a variation in the degree of exhaust flow suppression is recognized according to a difference between the first parameter value and the second parameter value. As a result, it is possible to easily and reliably determine whether the exhaust flow control device has failed or not (e.g., sticking in a state of opening) according to the absolute determination reference value.

In still another form of the present invention, the failure diagnostic device is operable when the exhaust flow control device has not broken down and the exhaust flow has been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is suppressed, for fixing the three parameters at the respective predetermined values, finding a value of the remaining one parameter as a second parameter value and determining whether the exhaust flow control device has failed according to a difference between the first parameter value and the second parameter value.

Specifically, a value of the remaining one parameter in the case where the exhaust flow control device has not broken down and the exhaust flow has been suppressed to a predetermined suppression degree is found in advance as a first parameter value (determination reference value), and a value of the remaining one parameter in the case where the exhaust flow is actually suppressed is found as a second parameter value, and a variation in the degree of exhaust flow suppression is recognized according to a difference between the first parameter value and the second parameter value. As a result, it is possible to easily and reliably determine whether the exhaust flow control device has failed or not (e.g., sticking in a state of opening) according, to the absolute determination reference value.

In still another form of the present invention, the failure diagnostic device is operable when the exhaust flow control device has not broken down and the exhaust flow has not been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is not suppressed, for fixing the three parameters at the respective predetermined values, finding a value of the remaining one parameter as a second parameter value and determining whether the exhaust flow control device has failed according to a difference between the first parameter value and the second parameter value.

Specifically, a value of the remaining one parameter in the case where the exhaust flow control device has not broken down and the exhaust flow has not been suppressed to a predetermined suppression degree is found in advance as a first parameter value (determination reference value), and a value of the remaining one parameter in the case where the exhaust flow is not actually suppressed is found as a second parameter value, and a variation in the degree of exhaust flow suppression is recognized according to a difference between the first parameter value and the second parameter value. As a result, it is possible to easily and reliably determine whether the exhaust flow control device has failed or not (e.g., sticking in a state of opening) according to the absolute determination reference value.

In still another preferred form of the present invention, the failure diagnostic device is operable after the internal combustion engine has stopped while the exhaust flow control device is suppressing the exhaust flow, for prohibiting or reducing the suppression by the exhaust flow control device.

Specifically, if the internal combustion engine stops (engine stop, turning-off of an engine key, and so forth) while the exhaust flow control device is suppressing the flow of exhaust, there is a high possibility that the exhaust flow control device fails. In this situation, by prohibiting or reducing the suppression of the exhaust flow, it is possible to avoid troubles which may occur during the control of the exhaust flow, thus securing the safety.

In this case, by finding a value of the remaining one parameter as a first parameter value (determination reference value) with a predetermined degree of suppression being set to a value different from the degree of suppression in the case where the exhaust flow is suppressed, it is possible to properly update the first parameter value (determination reference value) to the optimum value as the need arises and to reliably and accurately determine whether the exhaust flow control device has failed or not.

It is still another preferred form of the present invention, the exhaust emission control apparatus further comprises an air-fuel ratio control device that controls a combustion air-fuel ratio, and one of the fuel quantity and the intake air volume is controlled according to the combustion air-fuel ratio.

In this case, whether the exhaust flow control device has failed or not can be easily determined according to the combustion air-fuel ratio used in place of one of the fuel quantity and the intake air volume.

In still another preferred form of the present invention, the internal combustion engine comprises a cylinder injection type internal combustion engine that injects fuel directly into a combustion chamber, and comprises a two-stage combustion operation mode in which fuel is injected in an intake stroke or an compression stroke and additional fuel is then injected in an expansion stroke and afterward, and a compression slight-lean operation mode in which fuel is injected in the compression stroke with a combustion air-fuel ratio being set to a slightly lean air-fuel ratio; wherein the failure diagnostic device finds values of the remaining one parameter in each of the two-stage combustion operation mode and the compression slight-lean operation mode, and compares the values of the remaining one parameter with each other in each of the two-stage combustion operation mode and the compression slight-lean operation mode.

In this case, there is the tendency that the two-stage combustion operation mode and the compression slight-lean operation mode are selected in combination with the suppression of exhaust flow, but whether the exhaust flow control device has failed or not can be accurately determined by finding values of the remaining one parameter in each of the operation modes, and comparing the values of the remaining one parameter with each other in each of the operation modes.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The present invention will now be described in further detail with reference to the drawings showing preferred embodiments thereof.

Figure 1:
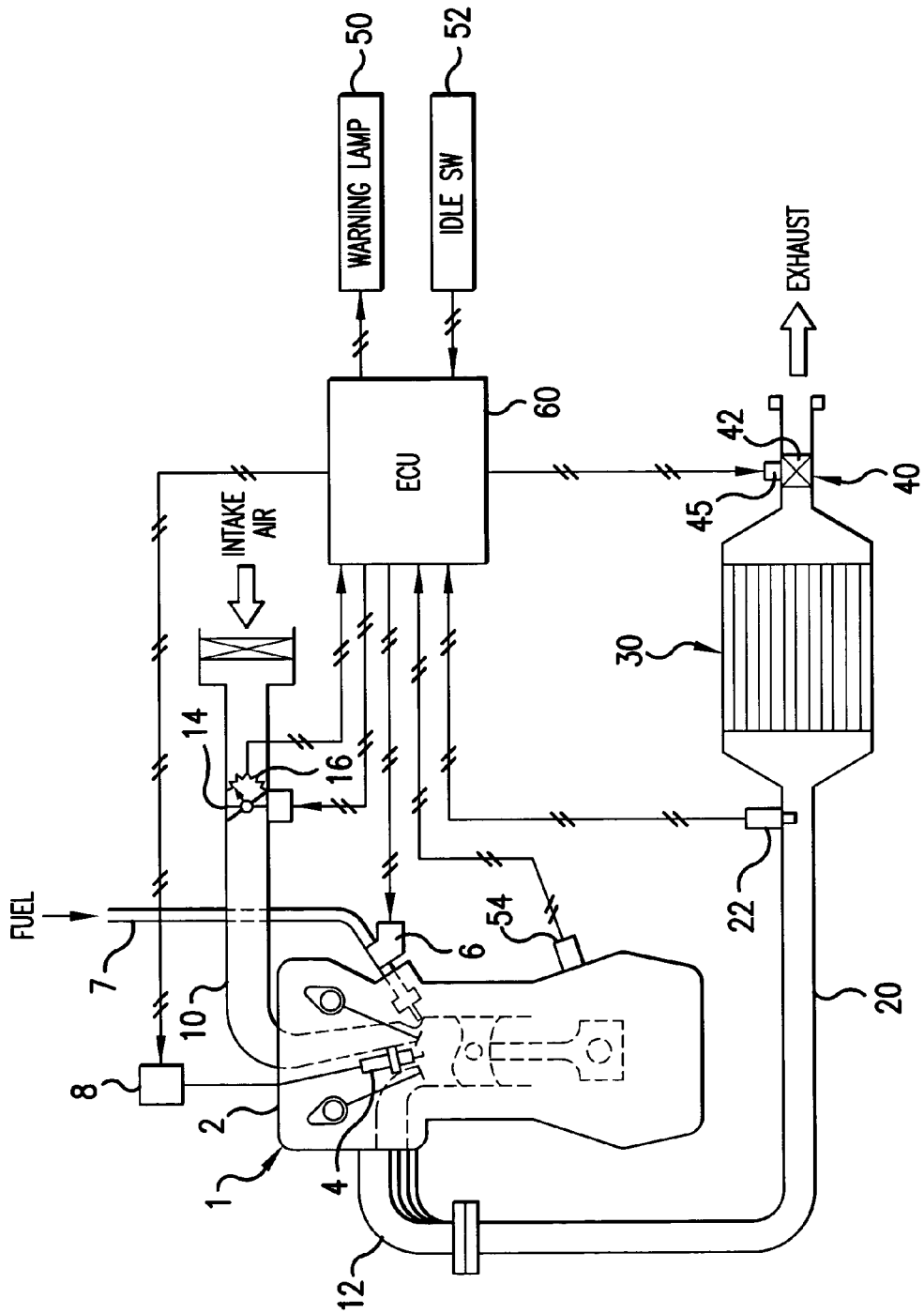
FIG. 1 is a view schematically showing the construction of an exhaust emission control apparatus for an internal combustion engine according to the present invention.

FIG. 1 is a view schematically showing the construction of an exhaust emission control apparatus for an internal combustion engine according to the present invention. A description will now be given of the construction of the exhaust emission control apparatus with reference to FIG. 1.

As shown in FIG. 1, for example, a cylinder injection type spark ignition gasoline engine, which is capable of performing fuel injection in an intake stroke (intake stroke injection) and fuel injection in a compression stroke (compression stroke injection) by switching fuel injection modes, is used as an engine body (hereinafter referred to as "engine") 1 as an internal combustion engine. The cylinder injection type engine 1 is capable of easily operating at a stoichiometric air-fuel ratio, operating at a rich air-fuel ratio (rich air-fuel ratio operation), and operating at a lean air-fuel ratio (lean air-fuel ratio operation).

As shown in FIG. 1, an ignition plug 4 and an electromagnetic type fuel injection valve 6 are attached to a cylinder head 2 of each cylinder of the engine 1 so that fuel can be injected directly into a combustion chamber.

An ignition coil 8, which outputs a high voltage, is connected to the ignition plug 4. A fuel supply device, not shown, including a fuel tank is connected to the fuel injection valve 6 via a fuel pipe 7. In further detail, the fuel supply device is provided with a low-pressure fuel pump and a high-pressure fuel pump to supply fuel stored in the fuel tank to the fuel injection valve 6 at a low fuel pressure or a high fuel pressure, and injecting the fuel from the fuel injection valve 6 into the combustion chamber at a desired fuel pressure.

The cylinder head 2 of each cylinder is formed with an intake port in a substantially vertical direction, and an intake manifold 10 has one end thereof divided therefrom and connected to each intake port such that it is in communication with each intake port.

The intake manifold 10 is provided with an electromagnetic type throttle valve 14 that controls the intake air volume and a throttle position sensor (TPS) 16 that detects the throttle angle θth.

The cylinder head 2 of each cylinder is formed with an exhaust port in a substantially horizontal direction, and an exhaust manifold 12 has one end thereof divided therefrom and connected to each exhaust port such that it is in communication with each exhaust port.

Incidentally, the cylinder injection type engine 1 is known, and therefore detailed description of the construction thereof is omitted.

An exhaust pipe (exhaust passage) 20 is connected to the other end of the exhaust manifold 12, and a three-way catalyst (catalytic converter) 30 as an exhaust purifying catalyst device is placed in the exhaust pipe 20. A carrier of the three-way catalyst 30 contains copper (Cu), cobalt (Co), argentum (Ag), platinum (Pt), rhodium (Rh), or palladium (Pd) as an active noble metal.

Further, as shown in FIG. 1, an $O_2$ sensor 22 that detects the oxygen concentration in exhaust is disposed in the exhaust pipe 20.

Further, an exhaust flow control device 40 is placed downstream of the three-way catalyst 30 in the exhaust pipe 20. Specifically, the exhaust flow control device 40 is intended to promote a reduction in harmful substances (such as unburned substances such as HC, CO, and $H_2$ as well as smoke, $NO_x$, and so forth) in exhaust gases, and is capable of changing at least one of the exhaust pressure, exhaust concentration, and exhaust flow rate. Specifically, the exhaust flow control device 40 is comprised of a sealed type opening and closing valve 42, which is capable of controlling the area of passage in the exhaust pipe 20 and is electrically connected to an electronic control unit (ECU) 60.

Figure 2A:
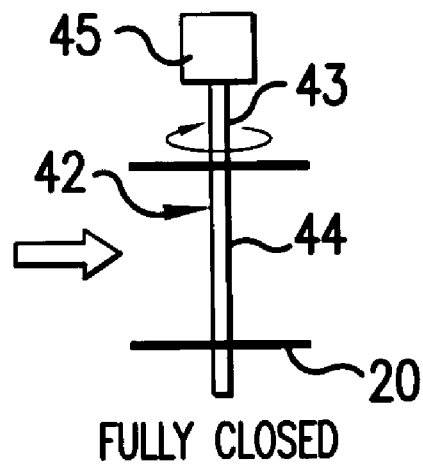
FIGS. 2A and 2B are views showing a butterfly valve as a sealed type opening and closing valve.
Figure 2B:
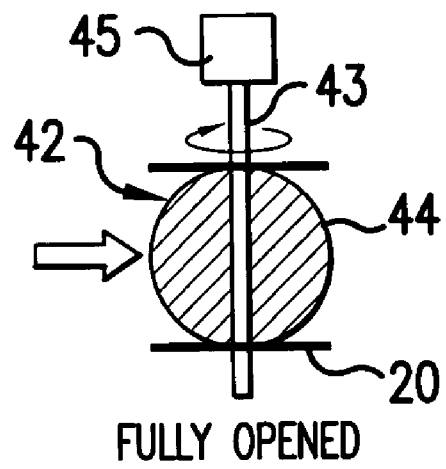

Various types of valves may, be employed as the sealed type opening and closing valve 42, but a butterfly valve as shown in FIG. 2 is employed here. The butterfly valve is capable of controlling the area of passage in the exhaust pipe 20 by rotating its disk 44 about a shaft 43 penetrating through the exhaust pipe 20 as viewed in FIG. 2 wherein FIG. 2A shows a valve closed state and FIG. 2B shows a valve opened state. The butterfly valve is provided with an actuator 45, and the actuator 45 rotates the valve body 44 about the shaft 43 to open and close the butterfly valve.

The ECU 60 is comprised of an input/output device, a storage device (such as a ROM, a RAM, or a nonvolatile RAM), a central processing unit (CPU), a timer counter, and so forth. The ECU 60 controls the overall operations of the exhaust emission promotion apparatus including the engine 1.

A variety of sensors such as an idle SW (switch) 52 and a crank angle sensor 54 as well as the above-mentioned TPS 16 and $O_2$ sensor 22 are connected to the input side of the ECU 60 so that information detected by these sensors can be inputted to the ECU 60. It should be noted that the engine speed Ne is calculated based on the crank angle detected by the crank angle sensor 54 (engine speed detecting device).

On the other hand, the above-mentioned variety of output devices such as the fuel injection valve 6, ignition coil 8, throttle vale 14, and actuator 45 are connected to the output side of the ECU 60. The fuel injection quantity, fuel injection timing, ignition timing, valve angle, and so forth calculated based on the detection results obtained by the sensors are outputted to the respective output devices, so that the fuel injection valve 6 injects a proper quantity of fuel in proper timing (fuel quantity control device), the ignition plug 4 performs spark ignition in proper timing (ignition timing control device), and the sealed type opening and closing valve 42 is properly controlled to achieve a desired valve angle. In further detail, the combustion air-fuel ratio (A/F) is determined based on the detection results obtained by the variety of sensors (air-fuel control device), and the fuel injection quantity Qf, the throttle angle θth, and so forth are determined according to the A/F (fuel quantity control device and an intake air volume control device). Note that a warning lamp 50 is also connected to the output side of the ECU 60.

Further, the fuel injection valve 6 has a two-stage combustion operation node in which two-stage combustion is carried out such that main injection for main combustion is performed using the fuel injection valve 6, and sub-injection of fuel is performed in the later stage of an expansion stroke and afterward. In the two-stage combustion operation mode, the main injection is performed in the compression stroke, and the A/F in the main combustion is set to a lean air-fuel ratio at which the quantity of oxygen ($O_2$) is large.

The above described two-stage combustion enables surplus oxygen (surplus $O_2$) remained in an exhaust system (from the combustion chamber to the three-way catalyst 30) after the main combustion and unburned substances (such as HC and CO) remained in the sub-injection to coexist in the exhaust system. For example, in the case where the three-way catalyst 30 has not yet been activated at the time of cold-start of the engine 1 or the like, the surplus $O_2$ and the unburned substances such as HC and CO react with each other in the exhaust system to promote the purification of exhaust emission and promptly activate the three-way catalyst 30 (exhaust gas temperature increase control).

Further, in the exhaust emission control apparatus according to the present invention, the engine 1 also has a compression slight-lean operation mode (compression S/L operation mode) in which main injection is performed in the compression stroke and more preferably in the middle stage of the compression stroke and afterward using the fuel injection valve 6, and the main injection is performed with the A/F being set to a slightly leaner air-fuel ratio (which may include a stoichiometric air-fuel ratio) than the stoichiometric air-fuel ratio.

The compression slight-lean (compression S/L) operation as described above stratifies the A/F at the time of combustion, and this increases the amount of oxygen and CO in exhaust gases after the combustion. This makes it possible to oxygen and CO to coexist in the exhaust system (from the combustion chamber to the three-way catalyst 30) while the engine power is secured to some extent. The reaction of the oxygen and CO in the exhaust system promotes the purification of exhaust, and increases the exhaust gas temperature to promptly activate the three-way catalyst 30 (exhaust gas temperature increase control). In particular, if the compression S/L operation is carried out when the engine 1 is operated at a low load after the two-stage combustion, the three-way catalyst 30 whose temperature has been increased by the two-stage combustion can be kept at a high temperature in a desirable manner, thus improving the exhaust purifying efficiency.

A description will now be given of the operation of the exhaust emission control apparatus according to the present invention constructed as described above, i.e. a method for determining whether the exhaust flow control device 40 comprised of the sealed type opening and closing valve 42 has failed or not (failure diagnostic device).

First, a description will be given of a first embodiment.

Figure 3:
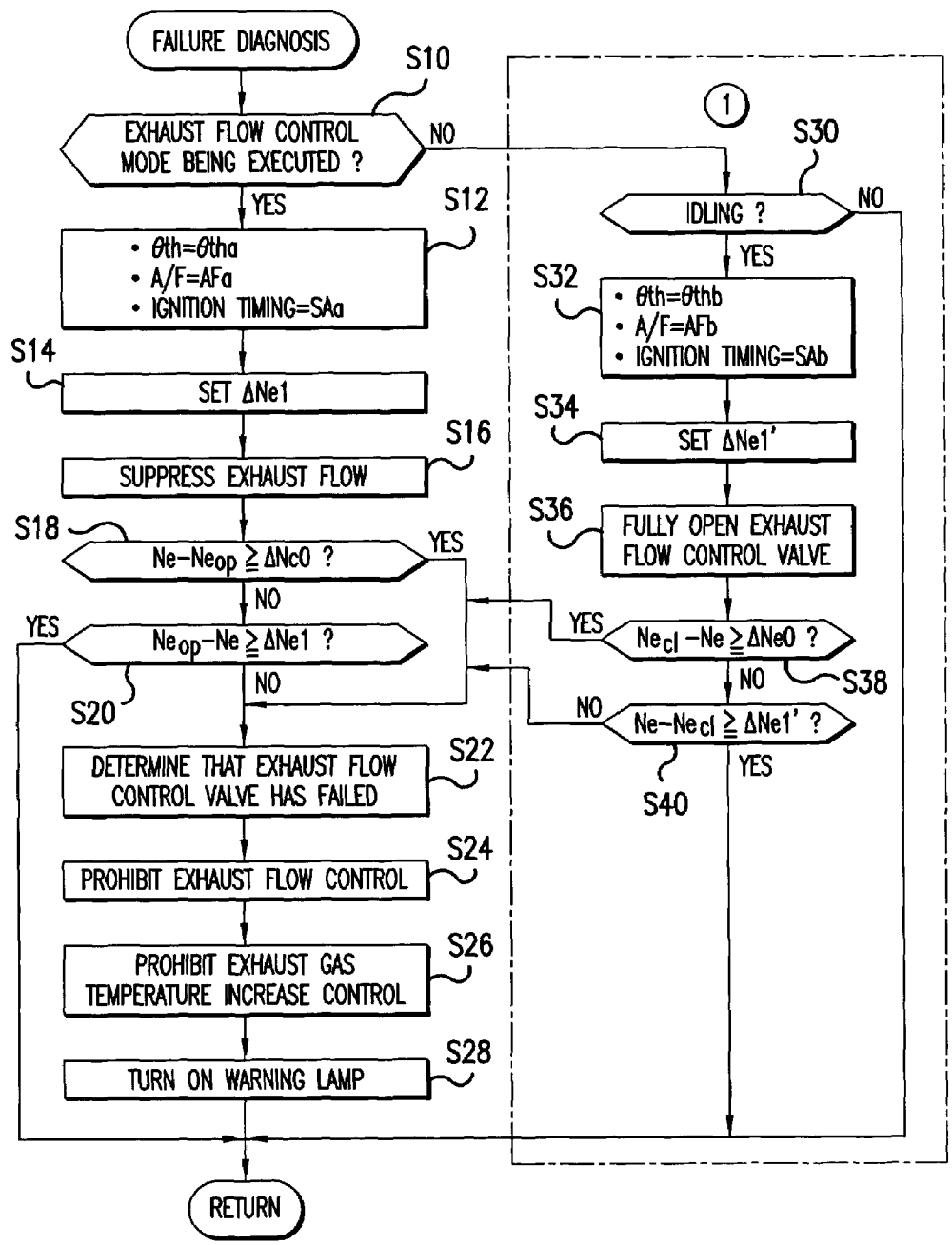
FIG. 3 is a flow chart showing a failure diagnosis routine according to a first embodiment of the present invention.

FIG. 3 is a flow chart showing a failure diagnosis routine according to the first embodiment of the present invention, and the following description will be given with reference to the flow chart of FIG. 3.

In Step S10, it is determined whether an exhaust flow control mode is being executed or not. Specifically, it is determined whether the ECU 60 has outputted an instruction for starting the exhaust flow control. If the determination result is True (Yes), the process proceeds to Step S12.

It should be noted that the exhaust flow control is carried out on the assumption that the exhaust gas temperature increase control is provided by the two-stage combustion operation, the compression S/L operation, and so forth, and thus, the determination as to whether control is provided in the exhaust flow control mode or not includes a determination as to whether the exhaust gas temperature increase control is being provided or not. Although in the present embodiment, the two-stage combustion operation and the compression S/L operation are carried out to provide the exhaust gas temperature increase control, a secondary air technique where the secondary air is introduced into exhaust may also be applied to provide the exhaust gas temperature increase control.

In the Step S12, the throttle angle θth is fixed at a predetermined value θtha, the A/F is fixed at a predetermined value AFa) (for example, the A/F is set to a value of 25 during the two-stage combustion operation, is set to a stoichiometric air-fuel ratio during the compression S/L operation, and is set to a value of 12 in the secondary air technique, but is set to the optimum value according to a system), and the ignition timing is fixed at a predetermined value SAa. It should be noted that the fuel injection quantity Qf may be fixed at a predetermined value Qfa in place of the A/F. If the fuel injection quantity Qf may be fixed at the predetermined value Qfa, the A/F may be fixed at the predetermined value AFa in place of the throttle angle θth. Further, the predetermined value θtha, the predetermined value SAa, and the predetermined value Qfa may be corrected according to the cooling water temperature of the engine 1.

In Step S14, a predetermined deviation ΔNe1 serving as a determination threshold for the engine speed Ne as described later is set based on the target exhaust pressure (the target degree of suppression) according to the following equation (1):

$$\Delta Ne1 = (\text{target exhaust pressure (mmHg)}/100 \text{ mmHg}) \times 0.02 \times Neop \quad (1)$$

where Neop is the target engine speed (first parameter) in the case where the sealed type opening and closing valve 42 is fully opened (the exhaust pressure is equal to the atmosphere pressure, and is 0 mmHg in the present embodiment) with the throttle angle θth being fixed at the predetermined value θtha, the A/F being fixed at the predetermined value AFa, and the ignition timing being fixed at the predetermined value SAa as described above. Further, the expression of (target exhaust pressure (mmHg)/100 mmHg)×0.02 means 2% per 100 mmHg of the target exhaust pressure.

Specifically, it was ascertained in experiments that when the sealed type opening and closing valve 42 was closed to increase the exhaust pressure with the throttle angle θth, the A/F (or the fuel injection quantity Qf), and the ignition timing (three parameters) being fixed, the engine torque or the engine speed Ne (the remaining one parameter) was decreased by about 3% per 100 mmHg of the exhaust pressure. In the present embodiment, a variation in the target engine speed Neop according to the target exhaust pressure is found as the predetermined deviation ΔNe1 with a margin of error of 1% (3%, 2%).

In Step S16, the sealed type opening and closing valve 42 is controlled to a predetermined angle (for example, fully closed) to suppress the flow of exhaust. This increases the exhaust pressure and promotes the oxidative reaction in the exhaust system.

In Step S18, in the state in which the exhaust pressure has been increased with the throttle angle θth being fixed at the predetermined value θtha, the A/F being fixed at the predetermined value AFa, and the ignition timing being fixed at the predetermined value SAa as described above, the present engine speed Ne (second parameter) is found based on information supplied from the crank angle sensor 54, and it is then determined whether or not a difference (Ne—Neop) between the present engine speed Ne and the target engine speed Neop is equal to or greater than a predetermined deviation ΔNe0 (for example, a value of 0). When the sealed type opening and closing valve 42 is fully opened, the engine speed Ne reaches its maximum value equivalent to the target engine speed Neop, and therefore, a difference (Ne—Neop) between the present engine speed Ne and the target engine speed Neop normally does not become equal to or greater than the predetermined deviation ΔNe0 (for example, a value of 0). Thus, the determination result is False (No), and the process proceeds to Step S20.

In the Step S20, it is determined whether or not a difference (Neop—Ne) between the target engine speed Neop and the present engine speed Ne is equal to or greater than the predetermined deviation ΔNe1 set in the Step S14.

As described above, if three parameters selected from the group consisting of the fuel injection quantity, ignition timing, intake air volume, and engine speed are fixed, the remaining one parameters varies with a change in the external load (the degree of exhaust flow suppression, i.e. the exhaust pressure) applied to the engine 1. Conversely, how the external load (the degree of exhaust flow suppression, i.e. the exhaust pressure) on the engine 1 varies can be easily recognized by monitoring a variation in the remaining one parameter with the three parameters being fixed.

For the reasons as described above, in consideration of the above characteristics, a variation in the engine speed Ne (the remaining one parameter) with respect to the target engine speed Neop, i.e. a difference (Neop—Ne) between the engine speed Ne and the target engine speed Neop is found with the throttle angle θth corresponding to the intake air volume, the A/F (or the fuel injection quantity Qf) corresponding to the fuel injection quantity, and the ignition timing (three parameters) being fixed. Then, by determining whether or not the variation is equal to or greater than the predetermined deviation ΔNe1, it is determined whether the flow of exhaust is properly suppressed by the sealed type opening and closing valve 42 or not, i.e. whether the exhaust pressure is properly increased or not. Namely, whether the sealed type opening and closing valve 42 is normally closing without any failure (e.g., sticking in a state of opening) is determined by monitoring the present engine speed Ne.

If the determination result in the Step S20 is True (Yes), i.e., if it is determined that a difference (Neop—Ne) between the target engine speed Neop and the engine speed Ne is equal to or greater than the predetermined deviation ΔNe1, it can be determined that the sealed type opening and closing valve 42 has not failed but is normally operating. In this case, this routine is brought to an end without doing anything.

On the other hand, if the determination result in the Step S20 is False (No), i.e., if it is determined that a difference (Neop—Ne) between the target engine speed Neop and the engine speed Ne is less than the predetermined deviation ΔNe1, or if the determination result in the Step S18 is True (Yes), it can be determined that the sealed type opening and closing valve 42 is malfunctioning due to some failure. Therefore, the process proceeds to Step S22 wherein it is determined that the sealed type opening and closing valve 42 has failed.

If it is determined that the sealed type opening and closing valve 42 has failed, it is considered to be difficult to suppress the flow of exhaust by the sealed type opening and closing valve 42. Thus, the suppression of exhaust flow control is prohibited in Step S24, and the exhaust gas temperature increase control (the two-stage combustion operation, the compression S/L operation, or the secondary air technique) is prohibited in Step S26. Further, in Step S28, the warning lamp 50 is turned on to inform the driver that the sealed type opening and closing valve 42 has failed.

It should be noted even after it is determined that the sealed type opening and closing valve 42 has failed, the determination result in the Step S20 may turn to True (Yes) due to the recover of the sealed type opening and closing valve 42 from malfunctioning. In this case, the determination may be withdrawn If the determination result in the Step S10 is False (No), i.e., if it is determined that control is not provided in the exhaust flow control mode, the process proceeds to Step S30.

In the Step S30, whether the engine 1 is idling or not is determined according to information supplied from the idle SW 52. Namely, it is determined whether the engine 1 is operating steadily or not. If the determination result is False (No), i.e. if it is determined that the engine 1 is not idling, this routine is brought to an end. On the other hand, if the determination result is True (Yes), i.e. if it is determined that the engine 1 is idling, the process proceeds to Step S32.

In the Step S32, as is the case with the Step S12, the throttle angle θth is fixed to a predetermined value θthb, the A/F is fixed at a predetermined value AFb, and the ignition timing is fixed at a predetermined value SAb. It should be noted that, in place of the A/F, the fuel injection quantity Qf may be fixed at a predetermined value Qfb. If the fuel injection quantity Qf is fixed at the predetermined value Qfb, the A/F may be fixed at the predetermined value AFb in place of the throttle angle θtha. Further, the predetermined value θthb, the predetermined value SAb, and the predetermined value Qfb may be corrected according to the cooling water temperature of the engine 1. Further, the predetermined value θthb and the predetermined value θtha may be equal, the predetermined value AFb and the predetermined value AFa may be equal, and the predetermined value SAb and the predetermined value SAa may be equal.

In Step S34, as is the case with the Step S14, a predetermined deviation ΔNe1' is found according to the equation (1) with the throttle angle θth being fixed to the predetermined value θthb, the A/F being fixed at the predetermined value AFb, and the ignition timing being fixed at the predetermined value SAb. In the next step S36, in response to the determination that the exhaust flow control mode is not being executed, the sealed type opening and closing valve 42 is controlled to be fully opened to inhibit the suppression of exhaust flow.

In Step S38, as is the case with the Step 18, in the state in which the throttle angle θth is fixed at the predetermined value θthb, the A/F is fixed at the predetermined value AFb, and the ignition timing is fixed at the predetermined value SAb, the present engine speed Ne is found based on information supplied from the crank angle sensor 54, and it is then determined whether or not a difference (Necl—Ne) between the present engine speed Ne and the target engine speed Necl (first parameter) in the case where the sealed type opening and closing valve 42 is fully closed is equal to or greater than the predetermined deviation ΔNe0 (for example, a value of 0). When the sealed type opening and closing valve 42 is fully closed, the engine speed Ne reaches its minimum value equivalent to the target engine speed Necl, and therefore, a difference (Necl—Ne) between the present engine speed Ne and the target engine speed Necl normally does not become equal to or greater than the predetermined deviation ΔNe0 (for example, a value of 0). Thus, the determination result is False (No), and the process then proceeds to Step S40.

In the Step S40, it is determined whether or not a difference (Ne—Necl) between the target engine speed Necl and the present engine speed Ne is equal to or greater than the predetermined deviation ΔNe1' set in the Step S34.

Specifically, on this occasion, as is the case with the step S20, a variation in the engine speed Ne (the remaining one parameter) with respect to the target engine speed Necl, i.e. a difference (Ne—Necl) between the engine speed Ne and the target engine speed Necl is found with the throttle angle θth corresponding to the intake air volume, the A/F (or the fuel injection quantity Qf) corresponding to the fuel injection quantity, and the ignition timing (three parameters) being fixed. Then, by determining whether or not the variation is equal to or greater than the predetermined deviation ΔNe1', it is determined whether the flow of exhaust is properly inhibited from being suppressed by the sealed type opening and closing valve 42 or not, i.e. whether the exhaust pressure is properly inhibited from being increased or not. Namely, whether the sealed type opening and closing valve 42 is normally opening without any failure (sticking in a state of closing) is determined by monitoring the present engine speed Ne.

If the determination result in the Step S40 is True (Yes), i.e., if it is determined that a difference (Ne—Necl) between the target engine speed Necl and the engine speed Ne is equal to or greater than the predetermined deviation ΔNe1', it can be determined that the sealed type opening and closing valve 42 has not failed but is normally operating. In this case, this routine is brought to an end without doing anything.

On the other hand, if the determination result in the Step S40 is False (No), i.e., if it is determined that a difference (Ne—Necl) between the target engine speed Necl and the engine speed Ne is less than the predetermined deviation ΔNe1', or if the determination result in the Step S38 is True (Yes), it can be determined that the sealed type opening and closing valve 42 is malfunctioning due to some failure. Therefore, the process proceeds to the above-mentioned Step S22 wherein it is determined that the sealed type opening and closing valve 42 has failed. Note that the same processing is performed in the Step 24 and afterward, and therefore description thereof is omitted.

As described above, according to the first embodiment of the present invention, only monitoring a variation in the present engine speed Ne with respect to the target engine speed Neop or Necl makes it possible to easily detect a failure (sticking in a state of opening) occurring when the sealed type opening and closing valve 42 is closing (the Steps S12 through S20) and detect a failure (sticking in a state of closing) occurring when the sealed type opening and closing valve 42 is opening (the Steps 32 through S40). As a result, it is possible to accurately and reliably determine whether the sealed type opening and closing valve 42 has failed or not irrespective of whether the exhaust flow control mode is being executed or not.

A description will now be given of a second embodiment.

Figure 4:
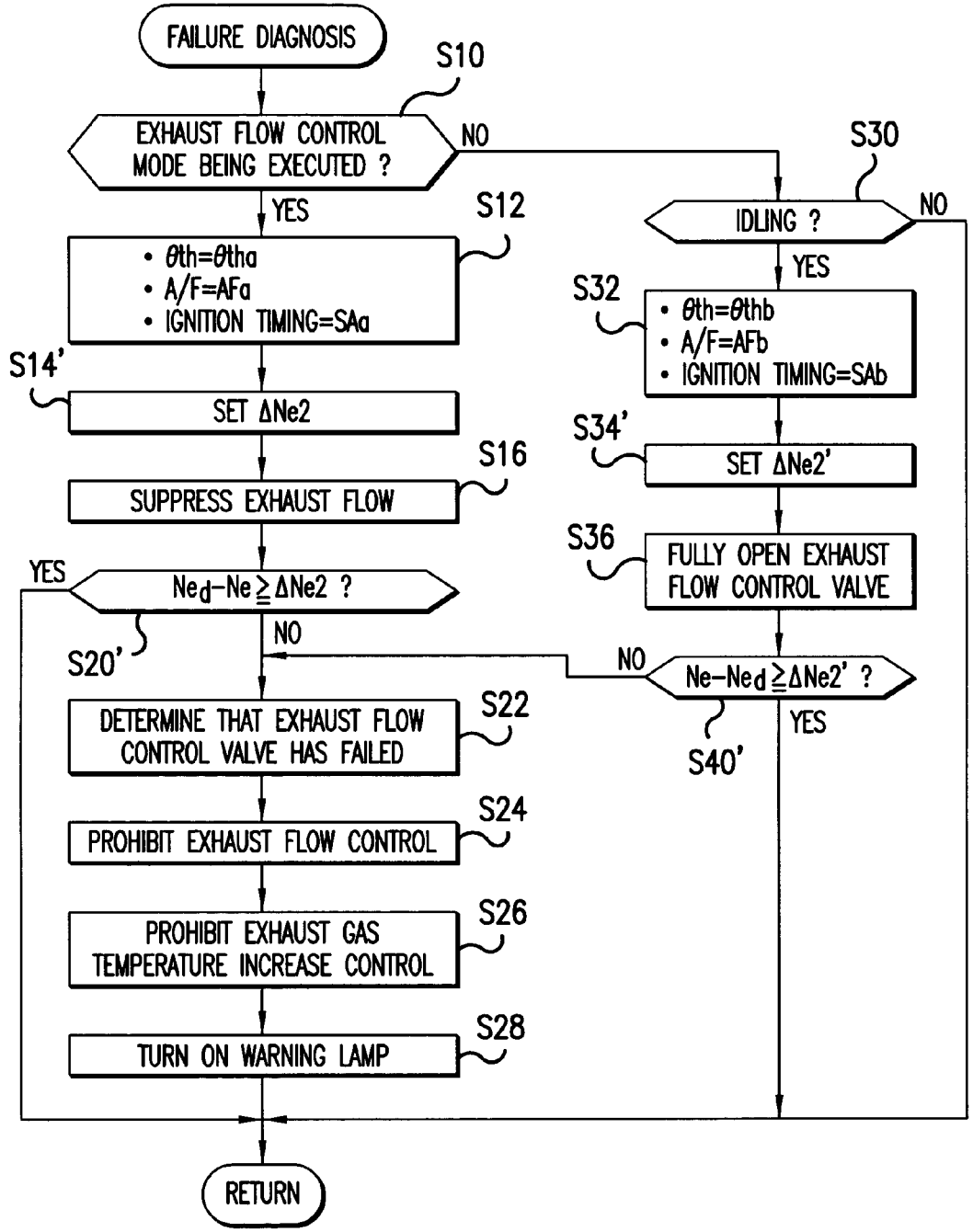
FIG. 4 is a flow chart showing a failure diagnosis routine according to a second embodiment of the present invention.

FIG. 4 is a flow chart showing a failure diagnosis routine according to the second embodiment of the present invention, and the following description will be given with reference to the flow chart of FIG. 4. Here, a description of parts and elements corresponding to those of the above described first embodiment is omitted, and a description of differences will only be given.

According to the second embodiment, it is determined in the Step S10 that the exhaust flow control mode is being executed, and in the Step S12, the throttle angle θth is fixed at the predetermined value θtha, the A/F is fixed at the predetermined value AFa, and the ignition timing is fixed at the predetermined value SAa. The process then proceeds to Step S14'.

In the Step S14', a predetermined deviation ΔNe2 serving as a determination threshold for the engine speed Ne is set according to the following equation (2):

$$\Delta Ne2 = (\text{target pressure (mmHg)}/100 \text{ mmHg}) \times 0.02 \times Ned \quad (2)$$

where Ned is the target engine speed (first parameter) in the case where the sealed type opening and closing valve 42 is set to an arbitrary predetermined angle with the throttle angle θth being fixed at the predetermined value θtha, the A/F being fixed at the predetermined value AFa, and the ignition timing being fixed at the predetermined value SAa as described above. Specifically, in the first embodiment, the predetermined deviation ΔNe1 is set based on the target engine speed Neop in the case where the sealed type opening and closing valve 42 is fully opened, but in the second embodiment, the predetermined deviation ΔNe2 is set based on the target engine speed Ned in the case where the sealed type opening and closing valve 42 is set to an arbitrary predetermined angle.

In the Step S16, the sealed type opening and closing valve 42 is controlled to a predetermined angle (for example, fully closed) to suppress the flow of exhaust. This increases the exhaust pressure and promotes the oxidative reaction in the exhaust system.

In Step S20', it is determined whether or not a difference (Ned—Ne) between the target engine speed Ned and the present engine speed Ne (second parameter) is equal to or greater than the predetermined deviation ΔNe2 set in the Step S14'.

Specifically, a variation in the engine speed Ne (the remaining one parameter) with respect to the target engine speed Neop, i.e. a difference (Ned—Ne) between the engine speed Ne and the target engine speed Ned is found with the throttle angle θth corresponding to the intake air volume, the A/F (or the fuel injection quantity Qf) corresponding to the fuel injection quantity, and the ignition timing (three parameters) being fixed at the respective predetermined values. Then, by determining whether or not the variation is equal to or greater than the predetermined deviation ΔNe2, it is determined whether the flow of exhaust is properly suppressed by the sealed opening and closing valve 42 or not, i.e. whether the exhaust pressure is properly increased or not.

If the determination result in the Step S20' is True (Yes), i.e., if it is determined that a difference (Ned—Ne) between the target engine speed Ned and the engine speed Ne is equal to or greater than the predetermined deviation ΔNe2, it can be determined that the sealed type opening and closing valve 42 has not failed but is normally operating. In this case, this routine is brought to an end without doing anything.

On the other hand, if the determination result in the Step S20' is False (No), i.e., if it is determined that a difference (Ned—Ne) between the target engine speed Ned and the engine speed Ne is less than the predetermined deviation ΔNe2, it can be determined that the sealed type opening and closing valve 42 is malfunctioning due to some failure. Therefore, the process proceeds to the Step S22 wherein it is determined that the sealed type opening and closing valve 42 has failed. Then, the suppression of exhaust flow is prohibited, and the exhaust temperature is prohibited from being increased (the Steps S24 and S26). Further, the warning lamp 50 is turned on (the step S28).

On the other hand, if the determination result in the Step S20' is False (No), i.e., if the process proceeds to the Step S30 wherein whether the engine 1 is idling or not is determined as is the case with the first embodiment. If the determination result is False (No), i.e. if it is determined that the engine 1 is not idling, this routine is brought to an end. On the other hand, if the determination result is True (Yes), i.e. if it is determined that the engine 1 is idling, the process proceeds to the Step S32 wherein the throttle angle θth is fixed at the predetermined value θthb, the A/F is fixed at the predetermined value AFb, and the ignition timing is fixed at the predetermined value SAb as is the case with the first embodiment.

In Step S34', as is the case with the Step S14', a predetermined deviation ΔNe2' is found according to the equation (2) with the throttle angle θth being fixed to the predetermined value θthb, the A/F being fixed at the predetermined value AFb, and the ignition timing being fixed at the predetermined value SAb. In the next step S36, in response to the determination that the exhaust flow control mode is not being executed, the sealed type opening and closing valve 42 is controlled to be fully opened to inhibit the suppression of exhaust flow.

After the suppression of the exhaust flow is suppressed, the process proceeds to Step S40' wherein it is determined whether or not a difference (Ne—Ned) between the present engine speed Ne and the target engine speed Ned is equal to or greater than the predetermined deviation ΔNe2'.

Specifically, in the Step S40', a variation in the engine speed Ne (the remaining one parameter) with respect to the target engine speed Ned, i.e. a difference (Ne—Ned) between the engine speed Ne and the target engine speed Ned is found with the throttle angle θth corresponding to the intake air volume, the A/F (or the fuel injection quantity Qf) corresponding to the fuel injection quantity, and the ignition timing (three parameters) being fixed. Then, by determining whether or not the variation is equal to or greater than the predetermined deviation ΔNe2', it is determined whether the suppression of exhaust flow by the sealed type opening and closing valve 42 is properly inhibited or not, i.e. whether the exhaust pressure is properly inhibited from being increased or not.

If the determination result in the Step S40' is True (Yes), i.e., if it is determined that a difference (Ne—Ned) between the target engine speed Ned and the engine speed Ne is equal to or greater than the predetermined deviation ΔNe2', it can be determined that the sealed type opening and closing valve 42 has not failed but is normally operating. In this case, this routine is brought to an end without doing anything.

On the other hand, if the determination result in the Step S40' is False (No), i.e., if it is determined that a difference (Ne—Ned) between the target engine speed Ned and the engine speed Ne is less than the predetermined deviation ΔNe2', it can be determined that the sealed type opening and closing valve 42 is malfunctioning due to some failure. Therefore, the process proceeds to the Step S22 wherein it is determined that the sealed type opening and closing valve 42 has failed. The same processing is performed in the Step 24 and afterward, and therefore description thereof is omitted.

As described above, according to the second embodiment of the present invention, monitoring a variation in the present engine speed Ne with respect to the target engine speed Ned with an arbitrary predetermined angle makes it possible to easily detect a failure (sticking in a state of opening) occurring when the sealed type opening and closing valve 42 is closed as well as a failure (sticking in a state of closing) occurring when the sealed type opening and closing valve 42 is opening. As a result, it is possible to reliably determine whether the sealed type opening and closing valve 42 has failed or not irrespective of whether the exhaust flow control mode is being executed or not.

A description will now be given of a third embodiment.

Figure 5:
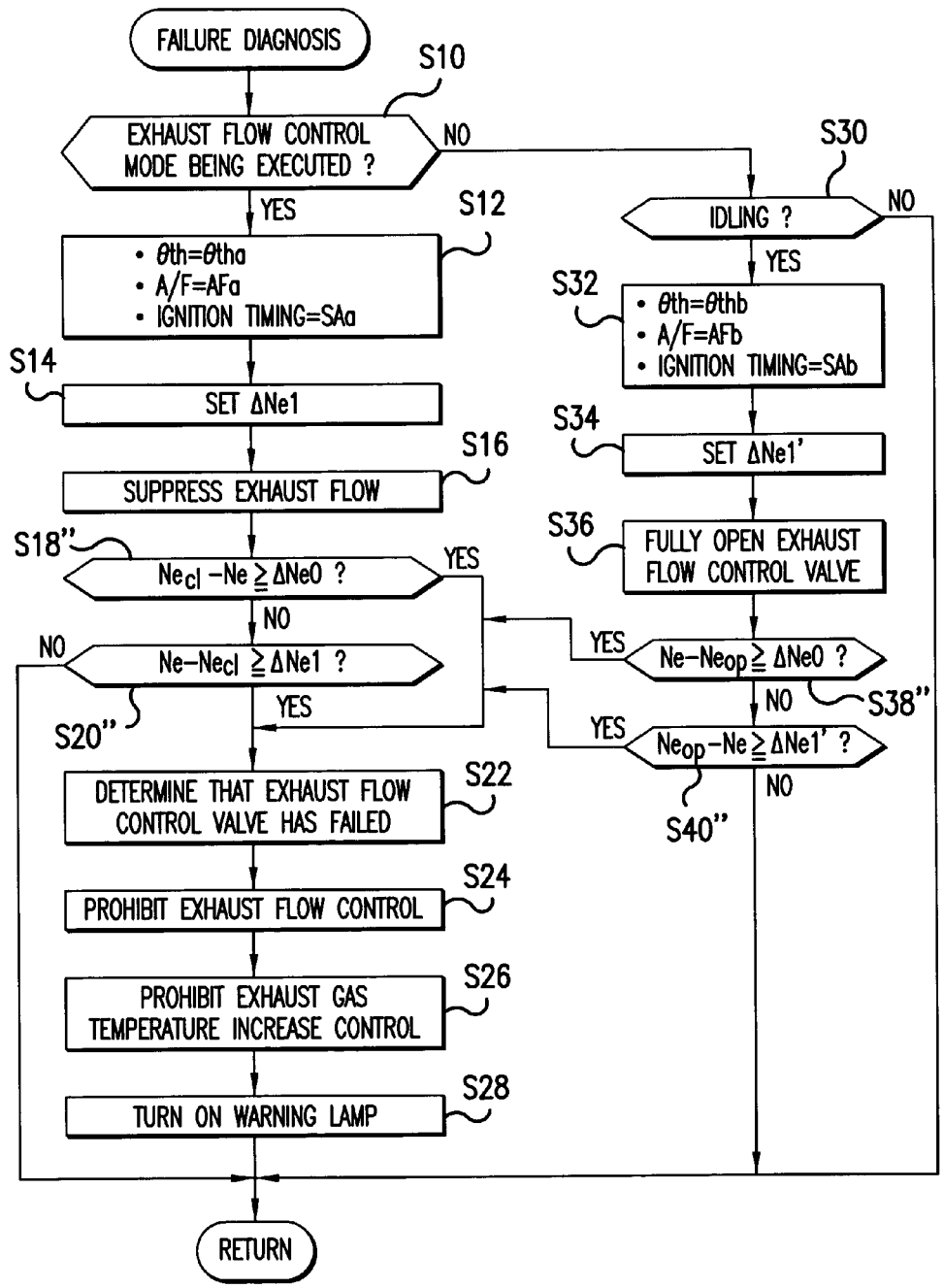
FIG. 5 is a flow chart showing a failure diagnosis routine according to a third embodiment of the present invention.

FIG. 5 is a flow chart showing a failure diagnosis routine according to the third embodiment of the present invention, and the following description will be given with reference to the flow chart of FIG. 5. Here, a description of parts and elements corresponding to those of the above described first embodiment is omitted, and only a description of differences will be given.

In the Step S16, the sealed type opening and closing valve 42 is controlled to a predetermined angle (for example, fully closed) to suppress the flow of exhaust. Then, in Step S18", as described above, in the state in which the exhaust pressure has been increased with the throttle angle θth being fixed at the predetermined value θtha, the A/F being fixed at the predetermined value AFa, and the ignition timing being fixed at the predetermined value SAa, the present engine speed Ne (second parameter) is found based on information supplied from the crank angle sensor 54, and it is then determined whether or not a difference (Necl—Ne) between the present engine speed Ne and the target engine speed Necl (first parameter) in the case where the sealed type opening and closing valve 42 is fully closed is equal to or greater than the predetermined deviation ΔNe0 (for example, a value of 0). When the sealed type opening and closing valve 42 is fully closed, the engine speed Ne reaches its minimum value equivalent to the target engine speed Necl, and therefore, a difference (Necl—Ne) between the present engine speed Ne and the target engine speed Necl normally does not become equal to or greater than the predetermined deviation ΔNe0 (for example, a value of 0). Thus, the determination result is False (No), and the process then proceeds to Step S20".

In the Step S20", it is determined whether or not a difference (Ne—Necl) between the target engine speed Necl and the present engine speed Ne is equal to or greater than the predetermined deviation ΔNe1 set in the Step S14.

On this occasion, a variation in the engine speed Ne (the remaining one parameter) with respect to the target engine speed Necl, i.e. a difference (Ne—Necl) between the target engine speed Necl and the engine speed Ne is found with the throttle angle θth corresponding to the intake air volume, the A/F (or the fuel injection quantity Qf) corresponding to the fuel injection quantity, and the ignition timing (three parameters) being fixed at the respective predetermined values. Then, by determining whether or not the variation is equal to or greater than the predetermined deviation ΔNe1, it is determined whether the flow of exhaust is properly suppressed by the sealed type opening and closing valve 42 or not, i.e. whether the exhaust pressure is properly increased or not.

If the determination result in the Step S20" is False (No), i.e., if it is determined that a difference (Ne—Necl) between the target engine speed Necl and the engine speed Ne is less than the predetermined deviation ΔNe1, the engine speed Ne is substantially equal to the target engine speed Necl, and thus, it can be determined that the sealed type opening and closing valve 42 has not failed but is normally functioning. In this case, this routine is brought to an end without doing anything.

On the other hand, if the determination result in the Step S20" is True (Yes), i.e., if it is determined that a difference (Ne—Necl) between the target engine speed Necl and the engine speed Ne is equal to or greater than the predetermined deviation ΔNe1, or if the determination result in the Step S18" is True (Yes), the engine speed Ne that should be originally equal to the target engine speed Necl is deviated from the target engine speed Necl, and thus, it can be determined that the sealed type opening and closing valve 42 is malfunctioning due to some failure. Therefore, the process then proceeds to the Step S22 wherein it is determined that the sealed type opening and closing valve 42 has failed.

On the other hand, in the Step S38", it is determined whether or not a difference (Ne—Neop) between the present engine speed Ne (second parameter) and the target engine speed Neop (first parameter) in the case where the sealed type opening and closing valve 42 is fully opened is equal to or greater than the predetermined deviation ΔNe0 (for example, a value of 0). When the sealed type opening and closing valve 42 is fully opened, the engine speed Ne reaches its maximum value equivalent to the target engine speed Neop, and therefore, a difference between the present engine speed Ne and the target engine speed Neop (Ne—Neop) normally does not become equal to or greater than the predetermined deviation ΔNe0 (for example, a value of 0). Thus, the determination result is False (No), and the process then proceeds to Step S40".

In the Step S40", it is determined whether or not a difference (Neop—Ne) between the target engine speed Neop and the present engine speed Ne is equal to or greater than the predetermined deviation ΔNe1' set in the Step S34.

On this occasion, as is the case with the step S20, a variation in the engine speed Ne (the remaining one parameter) with respect to the target engine speed Neop, i.e. a difference (Neop—Ne) between the engine speed Ne and the target engine speed Neop is found with the throttle angle θth corresponding to the intake air volume, the A/F (or the fuel injection quantity Qf) corresponding to the fuel injection quantity, and the ignition timing (three parameters) being fixed. Then, by determining whether or not the variation is equal to or greater than the predetermined deviation ΔNe1', it is determined whether the suppression of exhaust flow by the sealed type opening and closing valve 42 is properly inhibited or not, i.e. whether the exhaust pressure is properly inhibited from being increased or not. Namely, whether or not the sealed type opening and closing valve 42 is normally opening without any failure (sticking in a state of closing) is determined by monitoring the present engine speed Ne.

If the determination result in the Step S40" is False (No), i.e., if it is determined that a difference (Neop—Ne) between the target engine speed Neop and the engine speed Ne is less than the predetermined deviation ΔNe1', the engine speed Ne is substantially equal to the target engine speed Neop, and thus, it can be determined that the sealed type opening and closing valve 42 has not failed but is normally operating. In this case, this routine is brought to an end without doing anything.

On the other hand, if the determination result in the Step S40" is True (Yes), i.e., if it is determined that a difference (Neop—Ne) between the target engine speed Neop and the engine speed Ne is equal to or greater than the predetermined deviation ΔNe1', or if the determination result in the Step S38" is True (Yes), the engine speed Ne that should be originally equal to the target engine speed Neop is deviated from the target engine speed Neop, and thus, it can be determined that the sealed type opening and closing valve 42 is malfunctioning due to some failure. Therefore, the process proceeds to the Step S22 wherein it is determined that the sealed type opening and closing valve 42 has failed.

As described above, according to the third embodiment of the present invention, monitoring a variation in the present engine speed Ne with respect to the target engine speed Necl or Neop makes it possible to easily detect a failure (sticking in a state of opening) occurring when the sealed type opening and closing valve 42 is closing (the Steps S12 through S20") and detect a failure (sticking in a state of closing) occurring when the sealed type opening and closing valve 42 is opening (the Steps 32 through S40"). As a result, it is possible to accurately and reliably determine whether the sealed type opening and closing valve 42 has failed or not irrespective of whether the exhaust flow control mode is being executed or not.

A description will be given of a fourth embodiment.

Figure 6:
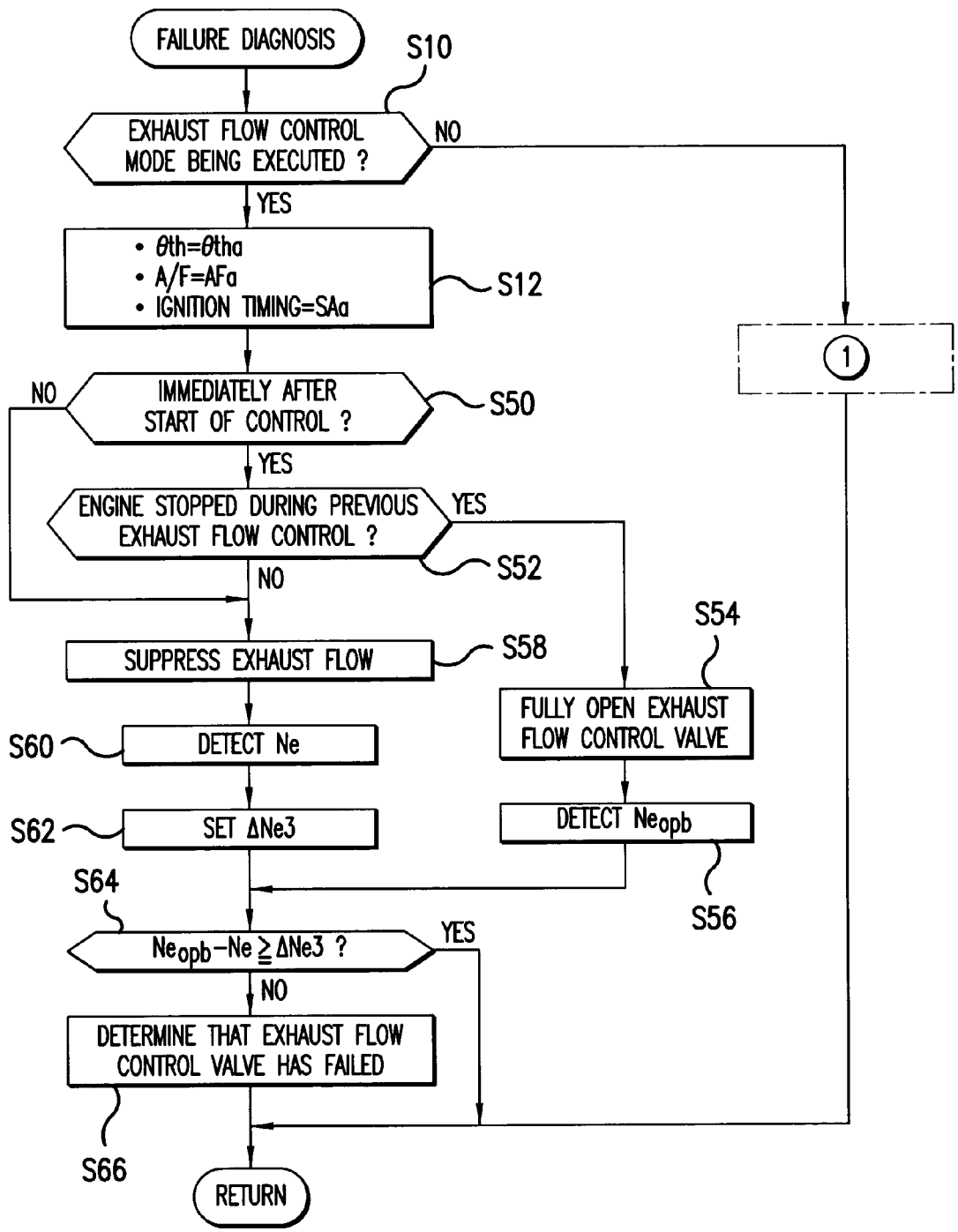
FIG. 6 is a flow chart showing a failure diagnosis routine according to a fourth embodiment of the present invention.

FIG. 6 is a flow chart showing a failure diagnosis routine according to the fourth embodiment of the present invention, and the following description will be given with reference to the flow chart of FIG. 6. Here, a description of parts and elements corresponding to those of the above described first embodiment is omitted, and only a description of differences will be given.

According to the present embodiment, it is determined in the Step S10 that the exhaust flow control mode is being executed, and in the Step S12, the throttle angle θth is fixed at the predetermined value θtha, the A/F is fixed at the predetermined value AFa, and the ignition timing is fixed at the predetermined value SAa. The process proceeds to Step S50.

In the Step S50, it is determined whether it is immediately after the start of control, i.e. whether or not processing is performed for the first time immediately after the start of the exhaust flow control mode. If the determination result is True (Yes), i.e. if it is immediately after the start of control, the process proceeds to Step S52.

In the Step S52, it is determined whether the engine 1 is stopped during the previous exhaust flow control or not. If the engine 1 is stopped during the previous exhaust flow control, i.e. while the sealed type opening and closing valve 42 is operating, it can be considered that the sealed type opening and closing valve 42 is likely to malfunction. If the determination result is True (Yes), i.e. if it is determined that the engine 1 is stopped during the previous exhaust flow control, the process then proceeds to Step S54. Incidentally, although in the present embodiment, it is only determined whether the engine 1 is stopped during the previous exhaust flow control, it may be determined whether or not the engine 1 is stopped within a predetermined period of time after the end of the previous exhaust flow control, whether the catalyst temperature is equal to or less than a predetermined temperature when the engine 1 is stopped during the previous exhaust flow control, whether the cooling water temperature is equal to or less than a predetermined temperature when the engine 1 is stopped during the previous exhaust flow control, whether the elapsed time after the start of the engine 1 in the case where the engine 1 is stopped during the previous exhaust flow control, and the like so as to further improve the reliability of the control.

In the Step S54, the sealed type opening and closing valve 42 is controlled to be fully opened to prohibit or reduce the suppression of exhaust flow in the state in which the throttle angle θth is fixed at the predetermined value θtha, the A/F is fixed at the predetermined value AFa, and the ignition timing SAa is fixed at the predetermined value SAa. In Step S56, the engine speed Ne on this occasion is detected as the target engine speed Neopb (first parameter). Specifically, the target engine speed Neopb in the case where the sealed type opening and closing valve 42 is fully opened is actually measured to be updated as a determination reference value (BASE Ne). It should be noted that the target engine speed Neopb may be either a mean value or an instantaneous value. Further, the initial value of the target engine speed Neopb is set in advance at the start of the control.

The determination result in the Step S50 is Fault (No) the next time this routine is executed, and the process then proceeds to Step S58.

In the Step S58, the sealed type opening and closing valve 42 is controlled to a predetermined angle (for example, fully closed) to suppress the flow of exhaust. This increases the exhaust pressure and promotes the oxidative reaction in the exhaust system.

In Step S60, in the state in which the exhaust pressure has been increased with the throttle angle θth being fixed at the predetermined value θtha, the A/F being fixed at the predetermined value AFa, and the ignition timing being fixed at the predetermined value SAa, the present engine speed Ne is detected based on information supplied from the crank angle sensor 54. It should be noted that the engine speed may be either a mean value or an instantaneous value.

In the next Step S62, a predetermined deviation $\Delta Ne3$ as a determination threshold for the engine speed Ne is set according to the following equation (3) similar to the equation (1):

$$\Delta Ne3 = (\text{target exhaust pressure (mmHg)}/100 \text{ mmhg}) \times 0.02 \times Neopb \quad (3)$$

In the next Step S64, it is determined whether or not a difference (Neopb—Ne) between the target engine speed Neopb detected in the Step S56 and the engine speed Ne (second parameter) detected in the Step S60 is equal to or greater than the predetermined deviation $\Delta Ne3$. If the determination result is True (Yes), i.e. if a difference (Neopb—Ne) between the target engine speed Neopb and the engine speed Ne is equal to or greater than the predetermined deviation $\Delta Ne3$, it can be determined that the sealed type opening and closing valve 42 has not failed but is normally operating. In this case, this routine is brought to an end without doing anything.

On the other hand, if the determination result of Step S64 is False (No), i.e. if a difference (Neopb—Ne) between the target engine speed Neopb and the engine speed Ne is less than the predetermined deviation $\Delta Ne3$, it can be determined that the sealed type opening and closing valve 42 is malfunctioning due to some failure. Therefore, the process proceeds to Step S66 that it is determined that the sealed type opening and closing valve 42 has failed.

Incidentally, as are the cases with the first and second embodiments, the exhaust flow control and the exhaust gas temperature increase control may be prohibited, and the warning lamp 50 may be turned on.

If the determination result in the Step S10 is False (No), i.e., if it is determined that the exhaust flow control mode is not being executed, the process proceeds to the Step S30 (indicated by ①) as is the case with the first embodiment.

As described above, according to the fourth embodiment of the present invention, monitoring a variation in the present engine speed Ne with respect to the target engine speed Neopb by actually measuring the target engine speed Neopb and updating it to the reference determination value (BASE Ne) as the optimum value makes it possible to easily detect a failure (sticking in a state of opening) occurring when the sealed type opening and closing valve 42 is closing and detect a failure (sticking in a state of closing) occurring when the sealed type opening and closing valve 42 is opening. As a result, it is possible to accurately determine whether the sealed type opening and closing valve 42 has failed or not irrespective of whether the exhaust flow control mode is being executed or not.

It should be noted that whether the sealed type opening and closing valve 42 has failed or not (sticking in a state of closing) may be determined in the Step S64 after the Step S56 according to the engine speed Ne stored in advance in the previous Step S60, and whether the sealed type opening and closing valve 42 has failed or not (sticking in a state of closing) may be determined while processing in the Step S30 and afterward (indicated by ①) is performed.

A description will now be given of a fifth embodiment.

Figure 7:
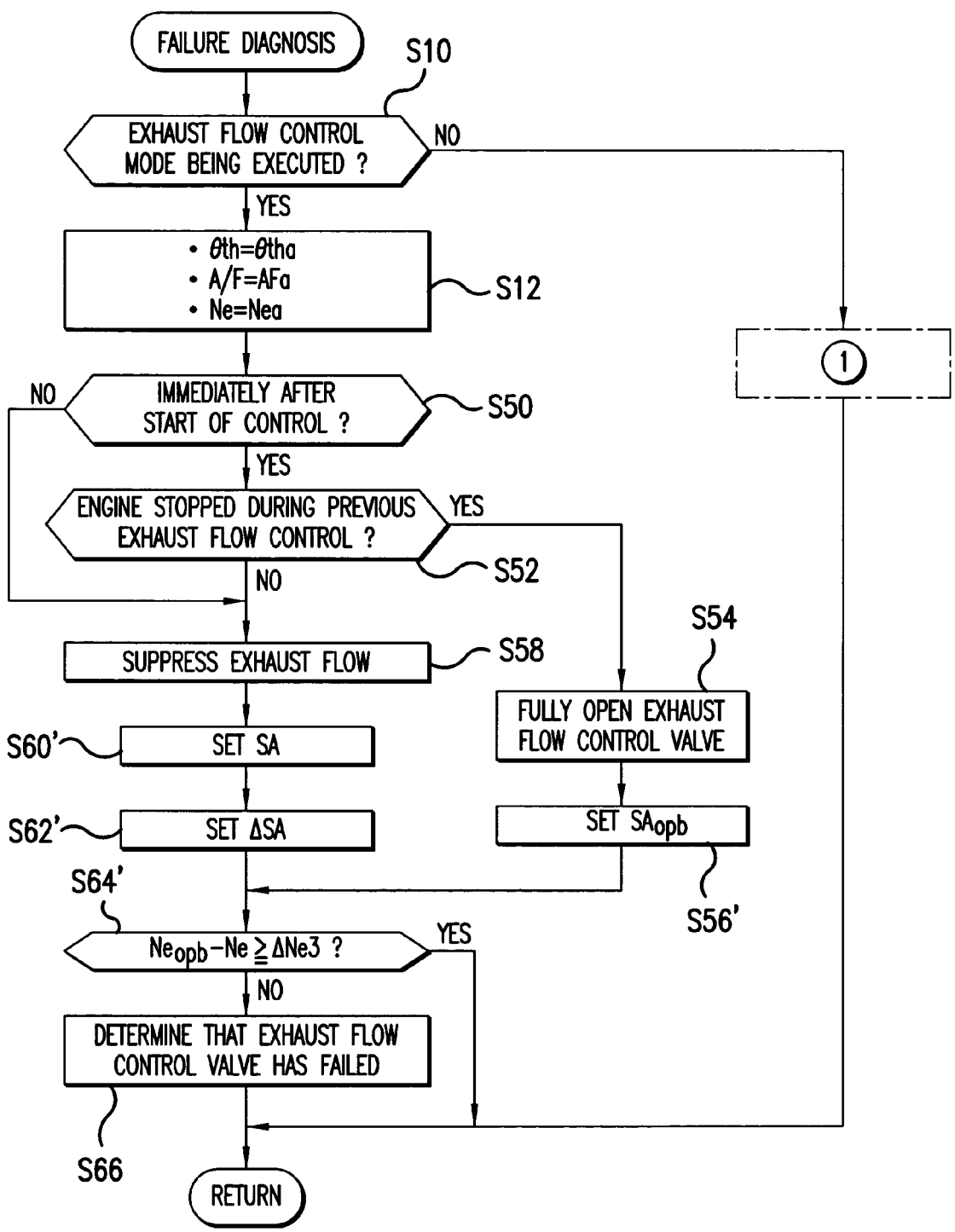
FIG. 7 is a flow chart showing a failure diagnosis routine according to a fifth embodiment of the present invention.

FIG. 7 is a flow chart showing a failure diagnosis routine according to the fifth embodiment of the present invention, and the following description will be given with reference to the flow chart of FIG. 7. It should be noted that the fifth embodiment is different from the fourth embodiment only in that the remaining one parameter is the ignition timing instead of the engine speed Ne, and a description of the difference will be given here.

According to the present embodiment, it is determined in the Step S10 that the exhaust flow control mode is being executed, and in the Step S12, the throttle angle θth is fixed at the predetermined value θtha, the A/F is fixed at the predetermined value AFa, and the engine speed Ne is fixed at a predetermined value Nea.

Then, after the Step S50, if the determination result of Step S52 is True (Yes) and it is determined that the engine 1 is stopped during the previous exhaust flow control, the process proceeds to the Step S54 wherein, in the state in which the throttle angle θth is fixed at the predetermined value θtha, the A/F is fixed at the predetermined value AFa, and the engine speed Ne is fixed at the predetermined value Nea, the sealed type opening and closing valve 42 is controlled to be fully opened to prohibit or reduce the suppression of exhaust flow. In Step S56', the ignition timing on this occasion is detected as the target ignition timing SAopb (first parameter). Specifically, the target ignition timing SAopb in the case where the sealed type opening and closing valve 42 is fully opened is updated as the determination reference value (BASE SA).

The determination result in the Step S50 is False (No) the next time this routine is executed, and the process then proceeds to the Step S58 wherein the sealed type opening and closing valve 42 is controlled to a predetermined angle (for example, fully closed) to suppress the flow of exhaust. This increases the exhaust pressure and promotes the oxidative reaction in the exhaust system.

In Step S60', the present ignition timing SA is set in the state in which the exhaust pressure has been increased with the throttle angle θth being fixed at the predetermined value θtha, the A/F being fixed at the predetermined value AFa, and the engine speed Ne being fixed at the predetermined value Nea. Incidentally, since the target ignition timing SAopb corresponds to the maximum retard angle, the ignition timing SA is set to be earlier than the target ignition timing SAopb.

In the next Step S62', a predetermined deviation $\Delta SA$ as a determination threshold for the ignition timing determined in advance is set.

In the next Step S64', it is determined whether or not a difference (SA—SAopb) between the target ignition timing SAopb detected in the Step S56' and the ignition timing SA (second parameter) detected in the Step S60' is equal to or greater than the predetermined deviation $\Delta SA$. If the determination result is True (Yes), i.e. if a difference (SA—SAopb) between the target ignition timing SAopb and the ignition timing SA is equal to or greater than the predetermined deviation $\Delta SA$, it can be determined that the sealed type opening and closing valve 42 has not failed but is normally operating. In this case, this routine is brought to an end without doing anything.

On the other hand, if the determination result in the Step S64' is False (No), i.e. if a difference (SA—SAopb) between the target ignition timing SAopb and the ignition timing SA is less than the predetermined deviation $\Delta SA$, it can be determined that the sealed type opening and closing valve 42 is malfunctioning due to some failure. Therefore, in this case, the process proceeds to the Step S66 that it is determined that the sealed type opening and closing valve 42 has failed.

Incidentally, as are the cases with the first and second embodiments, the exhaust flow control and the exhaust gas temperature increase control may be inhibited, and the warning lamp 50 may be turned on.

If the determination result in the Step S10 is False (No), i.e., if it is determined that the exhaust flow control mode is not in progress, the process proceeds to the Step S30 and afterward (indicated by ①) as is the case with the above described fourth embodiment.

As described above, according to the fifth embodiment of the present invention, monitoring a variation in the ignition timing with respect to the target ignition timing SAopb by using the ignition timing in place of the engine speed Ne as the remaining one parameter also makes it possible to easily detect a failure (sticking in a state of opening) occurring when the sealed type opening and closing valve 42 is closing and detect failure (sticking in a state of closing) occurring when the sealed type opening and closing valve 42 is opening. As a result, it is possible to accurately determine whether the sealed type opening and closing valve 42 has failed or not irrespective of whether the exhaust flow control mode is being executed or not.

It should be noted that in the fifth embodiment, whether the sealed type opening and closing valve 42 has failed or not (sticking in a state of closing) may be determined in the Step S64' after the Step S56' according to the ignition timing SA stored in advance in the previous Step S60', and whether the sealed type opening and closing valve 42 has failed or not (sticking in a state of closing) may be determined while processing is performed in the Step S30 and afterward (indicated by ①).

A description will now be given of a sixth embodiment.

Figure 8:
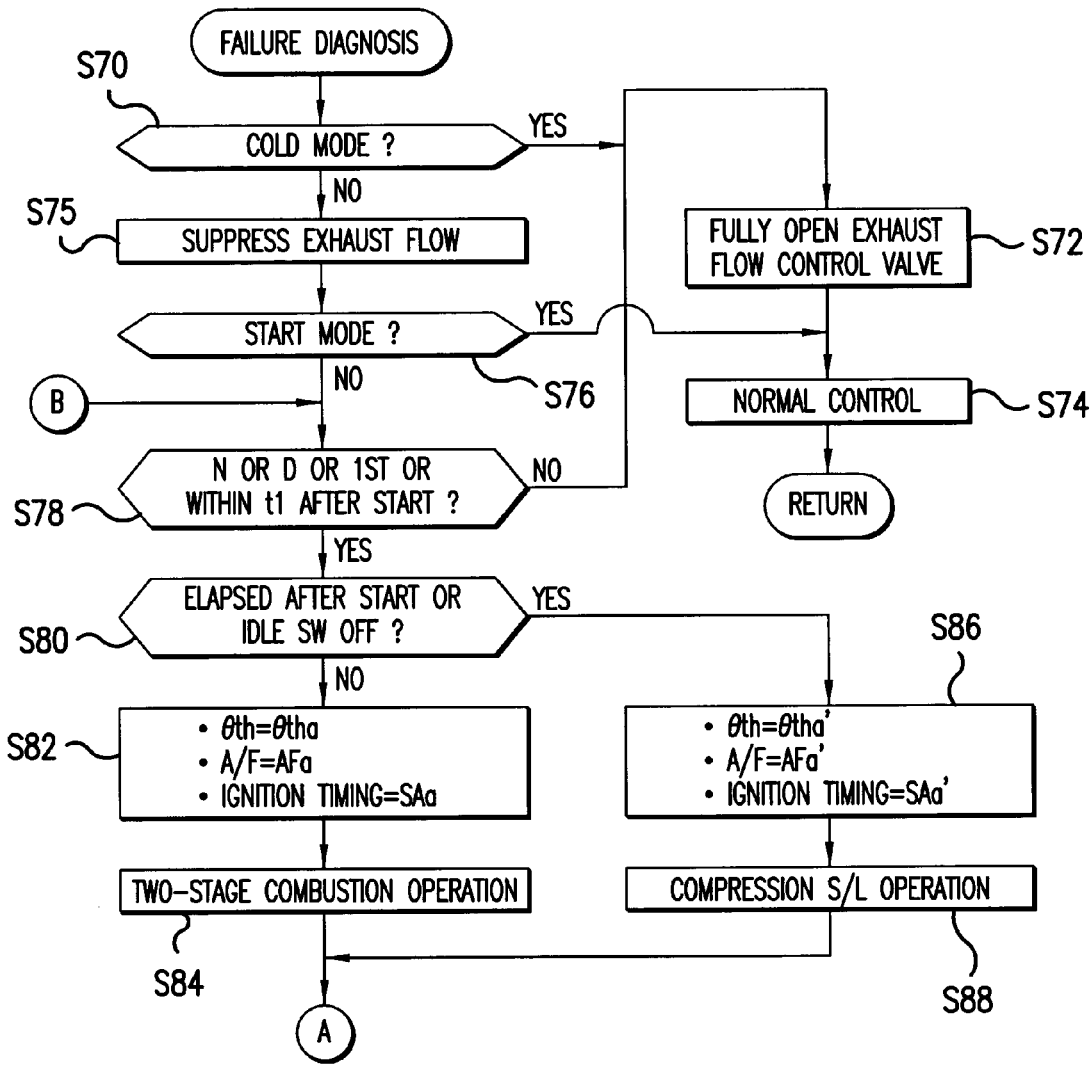
FIG. 8 is a flow chart showing a part of a failure diagnosis routine according to a sixth embodiment of the present invention.
Figure 9:
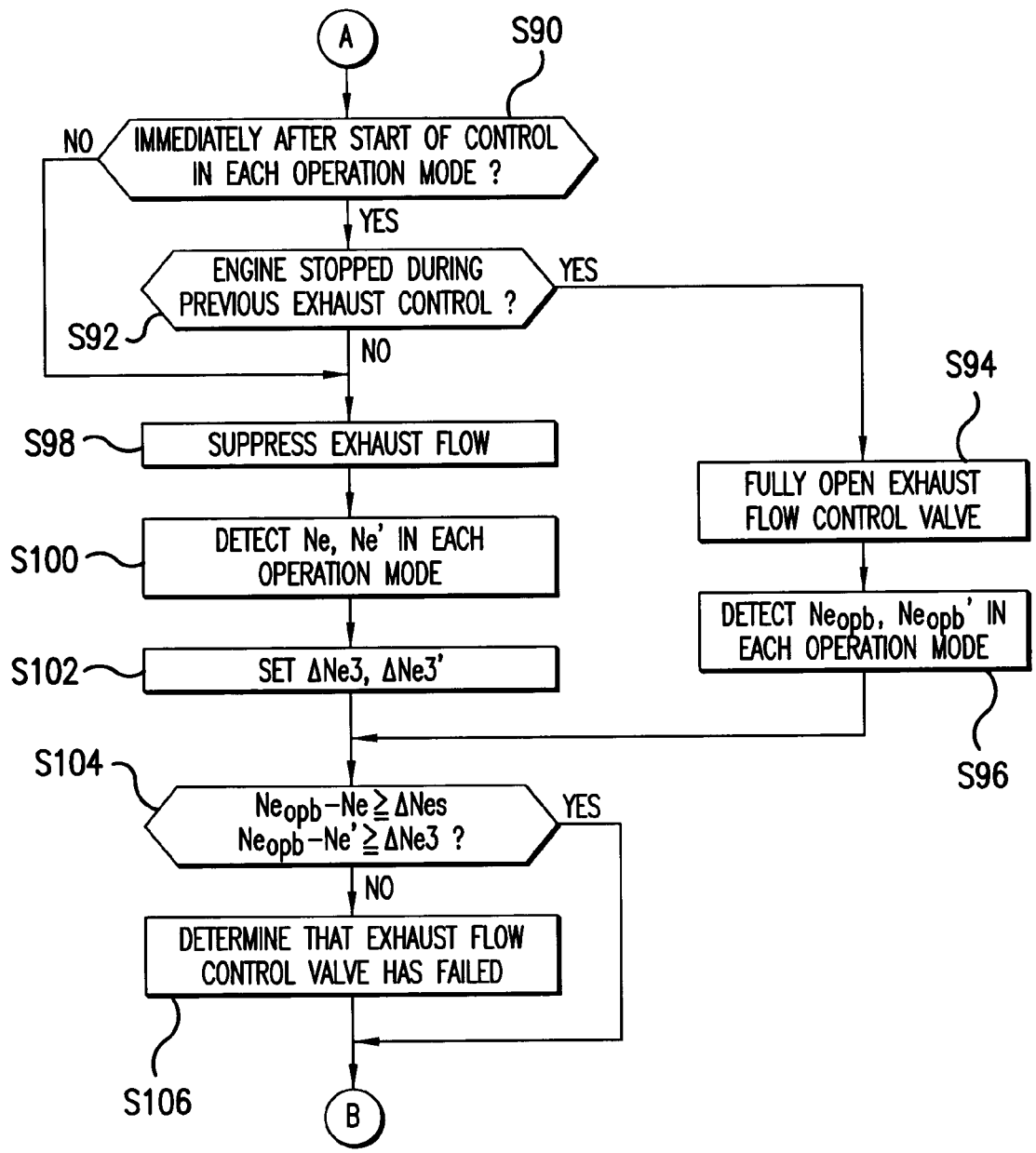
FIG. 9 is a flow chart showing a continued part of the failure diagnosis routine according to the sixth embodiment in FIG. 8.

FIGS. 8 and 9 are flow charts showing a failure diagnosis routine according to the sixth embodiment of the present invention, and the following description will be given with reference to the flow chart. Note that the sixth embodiment is a variation of the fourth embodiment, and only a description of differences from the fourth embodiment will now be given with a description of parts and elements corresponding to those of the fourth embodiment being omitted.

First, in Step S70, it is determined whether the engine 1 lies in a cold mode or not. Specifically, it is determined in the Step S70 whether it is necessary to provide control to increase the exhaust gas temperature and suppress the flow of exhaust. If the determination result of Step S70 is False (No), i.e. if it is determined that the engine 1 does not lie in the cold mode, the process then proceeds to Step S72 wherein the sealed type opening and closing valve 42 is controlled to be fully opened to inhibit the suppression of exhaust flow, and then proceeds to Step S74 wherein normal control is provided. On the other hand, if the determination result of Step S70 is True (Yes), i.e. if it is determined that the engine 1 lies in the cold mode, the process then proceeds to Step S75 wherein the sealed type opening and closing valve 42 is controlled a predetermined angle (for example, fully closed) to suppress the flow of exhaust. This increases the exhaust pressure and promotes the oxidative reaction in the exhaust system. The process then proceeds to Step S76.

In the Step S76, it is determined whether the engine 1 currently lies in a start mode. If the determination result is True (Yes), i.e. if it is determined that the engine 1 lies in the start mode, the process proceeds to the Step S74 wherein the normal control is provided. On the other hand, if the determination result is False (No), i.e. if it is determined that the engine 1 does not lie in the start mode, the process proceeds to Step S78.

In the Step S78, it is determined whether or not an automatic transmission, not shown, lies in any of the N range, D range, and 1st range or the elapsed time after the start is equal to or less than t1. If the determination result is False (No), e.g. if it is determined that the automatic transmission lies in the 2nd or more range and the elapsed time after the start is equal to or less than t1, the sealed type opening and closing valve 42 is fully opened in the Step S72, and the normal control is provided in the Step S74 as described above. On the other hand, if the determination result is True (Yes), the process proceeds to Step S80.

In the Step S80, it is determined whether or not the elapsed time after the start is greater than t2 (t2<t1) or the engine 1 is not idling with the idling SW 52 being OFF. Specifically, it is determined in the Step S80 whether the engine 1 has come out of the initial state in which it is warmed up. If the determination result is False (No), i.e. if it is determined that the engine 1 has been just started and is still idling, the process proceeds to Step S82.

In the Step S82, as is the case with the Step S12, the throttle angle θth is fixed at the predetermined value θtha, the A/F is fixed at the predetermined value AFa (the A/F is set to a value of 25 for example, but is set to the optimum value according to a system), and the ignition timing is fixed at the predetermined value SAa. In the next Step S84, the two-stage combustion is carried out in response to the determination that the engine 1 lies in the cold mode and has been just started. This promotes the oxidative reaction in the exhaust system, accelerates the purification of exhaust emission, and increases the exhaust gas temperature to promptly activate the three-way catalyst 30.

On the other hand, if the determination result in the Step S80 is True (Yes), i.e. if the elapsed time after the start is greater than t2 or the engine 1 is not idling with the idle SW 52 being ON, and it is determined that the engine 1 has come out of the initial state in which it is warmed up, in Step S86 the throttle angle θth is fixed at a predetermined value θtha', the A/F is fixed at a predetermined value AFa' (the A/F is set to a stoichiometric air-fuel ratio for example, but is set to the optimum value according to a system), and the ignition timing is fixed at a predetermined value SAa'. In the next Step S88, the compression S/L operation is carried out in response to the determination that the engine 1 has come out of the initial state in which it is warmed up. This promotes, when the engine 1 is operated at a low load, the oxidative reaction in the exhaust system, accelerates the purification of exhaust emission while securing the engine power, and maintains the three-way catalyst 30, which has been increased in temperature by the two-stage combustion, at a high temperature in a preferable manner to improve the exhaust purifying efficiency.

In Step S90 shown in FIG. 9, it is determined whether it is immediately after the start of control in each operation mode, i.e. whether or not processing is performed for the first time after the start of the two-stage combustion operation mode or after the start of the compression S/L operation mode. If the determination result is True (Yes), i.e. if it is immediately after the start of control in each operation mode, the process proceeds to Step S92.

In the Step S92, as is the case with the Step S52, it is determined whether the engine 1 is stopped during the previous exhaust flow control or not. If the determination result is True (Yes), i.e. if it is determined that the engine 1 is stopped during the previous exhaust flow control, the process then proceeds to Step S94 wherein the sealed type opening and closing valve 42 is controlled to be fully opened.

In Step S96, in the case of the two-combustion operation mode, the sealed type opening and closing valve 42 is controlled to be fully opened with the throttle angle θth being fixed at the predetermined value θtha, the A/F being fixed at the predetermined value AFa, and the ignition timing being fixed at the predetermined value SAa, and the engine speed Ne on this occasion is detected as the target engine speed Neopb (first parameter). On the other hand, in the case of the compression S/L operation mode, the sealed type opening and closing valve 42 is controlled to be fully opened with the throttle angle θth being fixed at the predetermined value θtha', the A/F being fixed at the predetermined value AFa', and the ignition timing being fixed at the predetermined value SAa', and the engine speed Ne on this occasion is detected as the target engine speed Neopb' (first parameter). Specifically, the engine speed Ne detected when the sealed type opening and closing valve 42 is fully opened is actually measured as the engine speed Neopb and the target engine speed Neopb' in the respective operation modes, and is updated as the determination reference value (BASE Ne). It should be noted that each of the target engine speed Neopb and the target engine speed Neopb' may be either a mean value or an instantaneous value.

If the determination result in the Step S90 is False (No), i.e. if it is not immediately after the start of control in each operation mode, the process then proceeds to Step S98.

In the Step S98, the sealed type opening and closing valve 42 is controlled again to a predetermined angle (for example, fully closed) to suppress the flow of exhaust. This increases the exhaust pressure and promotes the oxidative reaction in the exhaust system.

In Step S100, in the case of the two-stage combustion operation mode, the present engine speed Ne (second parameter) is detected based on information supplied from the crank angle sensor 54 in the state in which the exhaust pressure has been increased with the throttle angle θth being fixed at the predetermined value θtha, the A/F being fixed at the predetermined value AFa, and the ignition timing being fixed at the predetermined value SAa. On the other hand, in the case of the compression S/L operation mode, the present engine speed Ne' (second parameter) is detected based on information supplied from the crank angle sensor 54 in the state in which the exhaust pressure has been increased with the throttle angle θth being fixed at the predetermined value θtha', the A/F being fixed at the predetermined value AFa', and the ignition timing being fixed at the predetermined value SAa'. Specifically, as is the case with the Step S96, the present engine speed Ne is detected as the engine speed Ne and the engine speed Ne' in the respective operation modes. It should be noted that each of the engine speed Ne and the engine speed Ne' may be either a mean value or an instantaneous value.

In the next Step S102, a predetermined deviation ΔNe3 and a predetermined deviation ΔNe3' as determination thresholds for the engine speed Ne are set for the respective operation modes according to the above equation (3), and in Step S104, it is determined whether or not a difference (Neopb—Ne) between the target engine speed Neopb detected in the Step S96 and the engine speed Ne detected in the Step S100 is equal to or greater than the predetermined deviation ΔNe3, and whether or not a difference (Neopb'—Ne') between the target engine speed Neopb' and the engine speed Ne' is equal to or greater than the predetermined deviation ΔNe3'. If the determination result is True (Yes), i.e. if it is determined that a difference (Neopb—Ne) between the target engine speed Neopb detected in the Step S96 and the engine speed Ne detected in the Step S100 is equal to or greater than the predetermined deviation ΔNe3, or a difference (Neopb'—Ne—) between the target engine speed Neopb' and the engine speed Ne' is equal to or greater than the predetermined deviation ΔNe3', it can be determined that the sealed type opening and closing valve 42 has not failed but is normally operating. In this case, the process returns to the Step S78 without doing anything, and the failure diagnosis is repeated until the determination result in the Step S78 is False (No).

On the other hand, if the determination result in the Step S104 is False (No), i.e. if it is determined that a difference (Neopb—Ne) between the target engine speed Neopb detected in the Step S96 and the engine speed Ne detected in the Step S100 is less than the predetermined deviation ΔNe3, or a difference (Neopb'—Ne') between the target engine speed Neopb' detected in the Step S96 and the engine speed Ne' detected in the Step S100 is less than the predetermined deviation ΔNe3', it can be determined that the sealed type opening and closing valve 42 is malfunctioning due to some failure. In this case, the process proceeds to Step S106 wherein it is determined that the sealed type opening and closing valve 42 has failed. The process then returns to the Step S78 to repeat the failure diagnosis until the determination result in the Step S78 is False (No).

Incidentally, as are the cases with the first and second embodiments, if it is determined that the sealed type opening and closing valve 42 has failed, the exhaust flow control and the exhaust gas temperature increase may be inhibited, and the warning lamp 50 may be turned on.

As described above, according to the sixth embodiment of the present invention, in the case where the two-stage combustion operation mode and the compression S/L operation mode are executed, a variation in the present engine speed Ne with respect to the target engine speed Neopb and a variation in the present engine speed Ne' with respect to the target engine speed Neopb' in the respective operation modes are monitored by actually measuring the target engine speed Neopb and the target engine speed Neopb' in the respective operation modes and is updated as the determination reference value (BASE Ne). Therefore, it is possible to easily detect a failure of the sealed type opening and closing valve 42, and to accurately determine whether the sealed type opening and closing valve 42 has failed or not.

It should be noted that in the sixth embodiment, whether the sealed type opening and closing valve 42 has failed or not (sticking in a state of opening) when the sealed type opening and closing valve 42 is closed is only determined, but as is the case with the first through fifth embodiments, whether the sealed type opening and closing valve 42 has failed or not (sticking in a state of closing) when it is opening may be determined in the Step S104 after the Step S96 according to the engine speed Ne and the engine speed Ne' detected in the previous Step S100 and stored in advance.

It should be understood that the present invention is not limited to the embodiments disclosed, but various variations of the above described embodiment may be possible without departing from the spirits of the present invention, including variations as described below, for example.

Although in the above described embodiments, the two-stage combustion mode and the compression S/L mode are executed, the two-stage combustion mode, the compression S/L mode, and the like should not necessarily be executed.

Further, although in the above described embodiments, whether the sealed type opening and closing valve 42 has failed or not is determined using the engine speed Ne or the ignition timing as the remaining one parameter, the present invention is not limited to this, but the remaining one parameter may be either the throttle angle θth or the A/F (or the fuel injection quantity Qf). Namely, irrespective of which is selected as the remaining one parameter from the group consisting of the engine speed Ne, the ignition timing, the throttle angle θth, and the A/F (or the fuel injection quantity Qf), it is possible to easily and reliably determine whether the sealed type opening and closing valve 42 has failed or not.

Further, although in the above described embodiments, the predetermined deviations $\Delta Ne1$, $\Delta Ne1'$, $\Delta Ne2$, $\Delta Ne2'$, $\Delta Ne3$, $\Delta Ne3'$, $\Delta SA$, and the like are calculated as the determination thresholds, they may be fixed values set to the optimum values in advance.

Further, although in the above described embodiments, whether the sealed type opening and closing valve 42 has failed or not is determined according to a difference between the target engine speed Neop, Ned, Neopb, or Neopb' and the actual engine speed Ne or Ne', or a difference between the target ignition timing SAopb and the actual ignition timing SA, the present invention is not limited to this, but, for example, whether the sealed type opening and closing valve 42 has failed or not may be determined according to the engine speed ratio or may be determined by directly comparing the target value and the actual value with each other insofar as a difference between the target value and the actual value can be determined.

Further, in the above described fourth through sixth embodiments, if it is determined that the engine 1 is stopped during the previous exhaust flow control, the sealed type opening and closing valve 42 is fully opened and the predetermined deviations $\Delta Ne3$ and $\Delta Ne3'$ are found based on the target engine speed Neop, the present invention is not limited to this, but as is the second embodiment, the sealed type opening and closing valve 42 may be set to an arbitrary predetermined angle and the predetermined deviation may be set based on the target engine speed Ned at the arbitrary predetermined angle.

Although not mentioned in the above description of the embodiments, the failure diagnosis should not necessarily be carried out if the target engine speed Neop, Ned, Neopb, or Neopb', the actual engine speed Ne or Ne', the target ignition speed SAopb, the actual ignition timing SA, or the like cannot be detected or set. Therefore, it is possible to prevent wrong determination.

Further, although in the above described embodiments, the sealed type opening and closing valve 42 is used as the exhaust flow control device 40, but the exhaust flow control device 40 may be configured in any ways insofar as it is capable of variably controlling the flow of exhaust.

Further, although in the above described embodiments, the cylinder injection type gasoline engine is used as the engine 1, the present invention is not limited to this, but either an intake pipe injection type gasoline engine or a diesel engine may be used as the engine 1.

What is claimed is:

1. An exhaust emission control apparatus for an internal combustion engine, comprising:
   an exhaust flow control device that suppresses exhaust flow so as to reduce harmful substances in exhaust;
   an engine speed detecting device that detects an engine speed;
   a fuel quantity control device that controls a fuel quantity contributed to output torque;
   an ignition timing control device that controls an ignition timing;
   an intake air volume control device that controls an intake air volume; and
   a failure diagnostic device that fixes three parameters selected from the group consisting of the engine speed detected by said engine speed detecting device, the fuel quantity controlled by said fuel quantity control device, the ignition timing controlled by said ignition timing control device, and the intake air volume controlled by said intake air volume control device at respective predetermined values and finds values of a remaining one parameter irrespective of a degree to which the exhaust flow is suppressed by said exhaust flow control device, and compares the values of the remaining one parameter with each other to determine whether said exhaust flow control device has failed.

2. An exhaust emission control apparatus for an internal combustion engine according to claim 1, wherein said failure diagnostic device is operable when the exhaust flow has not been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is suppressed, for fixing the three parameters at the respective predetermined values, finding a value of the remaining one parameter as a second parameter value, and determining whether said exhaust flow control device has failed according to a difference between the first parameter value and the second parameter value.

3. An exhaust emission control apparatus for an internal combustion engine according to claim 1, wherein said failure diagnostic device is operable when said exhaust flow control device has not failed and the exhaust flow has not been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is suppressed, for fixing the three parameters at the respective predetermined values, finding a value of the remaining one parameter as a second parameter value, and determining whether said exhaust flow control device has failed according to a difference between the first parameter value and the second parameter value.

4. An exhaust emission control apparatus for an internal combustion engine according to claim 1, wherein said failure diagnostic device is operable when said exhaust flow control device has not failed and the exhaust flow has been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is not suppressed, for fixing the three parameters at the respective predetermined values, finding a value of the remaining one parameter as a second parameter value, and determining whether said exhaust flow control device has failed according to a difference between the first parameter value and the second parameter value.

5. An exhaust emission control apparatus for an internal combustion engine according to claim 1, wherein said failure diagnostic device is operable when said exhaust flow control device has not failed and the exhaust flow has been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is suppressed, for fixing the three parameters at the respective predetermined values, finding a value of the remaining one parameter as a second parameter value and determining whether said exhaust flow control device has failed according to a difference between the first parameter value and the second parameter value.

6. An exhaust emission control apparatus for an internal combustion engine according to claim 1, wherein said failure diagnostic device is operable when said exhaust flow control device has not failed and the exhaust flow has not been suppressed, for fixing the three parameters at respective predetermined values and finding a value of the remaining one parameter as a first parameter value in advance in a state in which an instruction for making a degree of suppression of the exhaust flow equal to a predetermined degree of suppression has been issued, and is operable when the exhaust flow is not suppressed, for fixing the three parameters at the respective predetermined values, finding a value of the remaining one parameter as a second parameter value and determining whether said exhaust flow control device has failed according to a difference between the first parameter value and the second parameter value.

7. An exhaust emission control apparatus for an internal combustion engine according to any of claims 2 through 4, wherein said failure diagnostic device is operable when the difference between the first parameter value and the second parameter value is less than a predetermined value set according to a target degree of suppression when the exhaust flow is suppressed, for determining that said exhaust flow control device has failed.

8. An exhaust emission control apparatus for an internal combustion engine according to claim 5 or 6, wherein said failure diagnostic device is operable when the difference between the first parameter value and the second parameter value is greater than a predetermined value set according to a target degree of suppression when the exhaust flow is suppressed, for determining that said exhaust flow control device has failed.

9. An exhaust emission control apparatus for an internal combustion engine according to claim 1, wherein said failure diagnostic device is operable after the internal combustion engine has stopped while said exhaust flow control device is suppressing the exhaust flow, for prohibiting or reducing the suppression of the exhaust flow by said exhaust flow control device.

10. An exhaust emission control apparatus for an internal combustion engine according to claim 1, further comprising an air-fuel ratio control device that controls a combustion air-fuel ratio;

wherein one of the fuel quantity and the intake air volume is controlled according to the combustion air-fuel ratio.

11. An exhaust emission control apparatus for an internal combustion engine according to claim 1, wherein the internal combustion engine comprises a cylinder injection type internal combustion engine that injects fuel directly into a combustion chamber, and comprises a two-stage combustion operation mode in which fuel is injected in an intake stroke or an compression stroke and additional fuel is then injected in an expansion stroke and afterward, and a compression slight-lean operation mode in which fuel is injected in the compression stroke with a combustion air-fuel ratio being set to a slightly lean air-fuel ratio;

wherein said failure diagnostic device finds values of the remaining one parameter in each of said two-stage combustion operation mode and said compression slight-lean operation mode, and compares the values of the remaining one parameter with each other in each of said two-stage combustion operation mode and said compression slight-lean operation mode.

* * * * *